(12) United States Patent
Wieland et al.

(10) Patent No.: US 7,988,769 B2
(45) Date of Patent: Aug. 2, 2011

(54) DEVICE AND PROCESS FOR SEPARATING WET PAINT OVERSPRAY

(75) Inventors: Dietmar Wieland, Waiblingen (DE); Jens Holzheimer, Tamm (DE)

(73) Assignee: Durr Systems GmbH, Stuttgart (DE)

( * ) Notice: Subject to any disclaimer, the term of this patent is extended or adjusted under 35 U.S.C. 154(b) by 677 days.

(21) Appl. No.: 12/098,210

(22) Filed: Apr. 4, 2008

(65) Prior Publication Data
US 2008/0229925 A1 Sep. 25, 2008

Related U.S. Application Data

(63) Continuation of application No. PCT/EP2006/009563, filed on Oct. 3, 2006.

(30) Foreign Application Priority Data

Oct. 5, 2005 (DE) .......................... 10 2005 048 580

(51) Int. Cl.
*B01D 45/18* (2006.01)

(52) U.S. Cl. ............... 95/267; 95/280; 95/285; 96/372; 96/373; 55/308; 55/318; 55/339; 55/385.2; 55/DIG. 46; 118/309; 118/326; 427/300; 454/50; 454/53; 454/55

(58) Field of Classification Search ........ 454/50, 454/53, 55; 118/309, 326; 95/267, 280, 95/285; 96/372, 373; 427/300; 55/308, 55/318, 339, 385.2, DIG. 46
See application file for complete search history.

(56) References Cited

U.S. PATENT DOCUMENTS

| | | | | |
|---|---|---|---|---|
| 2,873,816 A * | 2/1959 | Umbricht et al. | ............... | 96/265 |
| 2,875,680 A * | 3/1959 | Forshee | .......................... | 454/53 |
| 3,516,388 A * | 6/1970 | Barnes | .......................... | 118/316 |
| 4,700,615 A * | 10/1987 | Napadow | .......................... | 454/54 |
| 4,857,367 A * | 8/1989 | Thorn et al. | .................. | 427/348 |
| 4,910,047 A * | 3/1990 | Barnett et al. | ................ | 427/195 |
| 4,946,718 A * | 8/1990 | Napadow | ...................... | 427/424 |
| 5,127,574 A * | 7/1992 | Mosser et al. | .............. | 236/44 R |
| 5,591,240 A | 1/1997 | Ophardt et al. | | |
| 5,782,943 A * | 7/1998 | O'Ryan et al. | .................. | 55/332 |
| 5,788,728 A * | 8/1998 | Solis et al. | ...................... | 55/422 |
| 5,922,130 A * | 7/1999 | Mosser et al. | ................ | 118/326 |
| 6,162,270 A * | 12/2000 | Nystrom et al. | ............. | 55/385.2 |
| 6,461,431 B1 * | 10/2002 | Ainsworth et al. | ........... | 118/326 |
| 6,723,169 B2 * | 4/2004 | Hihn et al. | ..................... | 118/309 |
| 6,752,854 B1 * | 6/2004 | Varone et al. | .................. | 95/216 |
| 6,852,165 B2 * | 2/2005 | Ainsworth et al. | ........... | 118/326 |
| 7,014,556 B2 * | 3/2006 | Ainsworth et al. | ............ | 454/50 |
| 7,029,533 B1 * | 4/2006 | Hedding | ........................ | 118/326 |
| 7,665,414 B2 * | 2/2010 | Shutic et al. | ................... | 118/309 |
| 2002/0020347 A1 | 2/2002 | Gelain | | |
| 2003/0192472 A1 * | 10/2003 | Hihn et al. | ..................... | 118/326 |
| 2004/0055705 A1 * | 3/2004 | Shutic et al. | ............... | 156/307.1 |
| 2004/0112215 A1 * | 6/2004 | Varone et al. | ................... | 95/216 |
| 2008/0229926 A1 * | 9/2008 | Wieland et al. | .................. | 95/278 |
| 2009/0209188 A1 * | 8/2009 | Wieland et al. | .................. | 454/54 |
| 2010/0197213 A1 * | 8/2010 | Holzheimer et al. | ........... | 454/50 |

FOREIGN PATENT DOCUMENTS

DE 2449065 A1 4/1976

(Continued)

*Primary Examiner* — Robert J Hill, Jr.
*Assistant Examiner* — Christopher P Jones
(74) *Attorney, Agent, or Firm* — Howard & Howard Attorneys PLLC

(57) ABSTRACT

In order to provide a device for separating wet paint overspray from an exhaust air flow containing overspray particles, passing into the exhaust air flow in an application region of a painting assembly, the device includes at least one separation device for separating the overspray from at least a part of the exhaust air flow. Clogging of a wall surface of the device with wet paint overspray is prevented. It is proposed that the device is divided into a plurality of sections below the application region. At least one separation device is provided in one of the sections. The device includes at least one air curtain producing device for generating an air curtain on a wall surface, which delimits the flow path of the exhaust air flow and is arranged on the at least one flow guide element.

40 Claims, 16 Drawing Sheets

FOREIGN PATENT DOCUMENTS

| | | |
|---|---|---|
| DE | 4014258 A1 | 11/1991 |
| DE | 4211465 C2 | 3/1996 |
| DE | 19610566 A1 | 9/1997 |
| DE | 69504511 T2 | 5/1999 |
| DE | 29907779 U1 | 8/1999 |
| DE | 10028553 A1 | 12/2001 |
| DE | 19705523 C2 | 1/2003 |
| DE | 10109574 C2 | 2/2003 |
| DE | 20218192 U1 | 4/2003 |
| DE | 20220435 U1 | 9/2003 |
| DE | 10341979 A1 | 3/2005 |
| DE | 10350332 A1 | 5/2005 |
| EP | 0371171 A1 | 11/1988 |
| EP | 1400347 A2 | 9/2003 |

* cited by examiner

DEVICE AND PROCESS FOR SEPARATING WET PAINT OVERSPRAY

RELATED APPLICATIONS

This application is a continuation application of PCT/EP2006/009563 filed Oct. 3, 2006, the entire specification of which is incorporated herein by reference, which claims priority to DE 10 2005 048 580.4 filed Oct. 5, 2005.

FIELD OF THE DISCLOSURE

The present invention relates to a device for separating wet paint overspray from an exhaust air flow containing overspray particles, wherein the overspray particles pass into the exhaust air flow into an application region of a painting assembly, and wherein the device comprises at least one separation device for separating the overspray from at least a part of the exhaust air flow.

BACKGROUND

Such a device is known, for example, from patent document DE 42 11 465 C2, and is used in assemblies for painting workpieces, in particular for spray-painting vehicle bodies, in which an air flow is generated through an application region of the assembly that discharges excess wet paint out of the application region.

SUMMARY OF THE INVENTION

The object forming the basis of the present invention is to provide a device of the aforementioned type, in which clogging of a wall surface of the device with wet paint overspray is prevented.

This object is achieved according to the invention with a device, in that the device comprises a flow chamber arranged below the application region, which is divided into a plurality of sections by at least one flow guide element, wherein at least one separation device is provided in one of the sections, and that the device comprises at least one air curtain producing device for generating an air curtain on a wall surface, which delimits the flow path of the exhaust air flow and is arranged on the at least one flow guide element.

The solution according to the invention is based on the concept that by means of the generated air curtain the exhaust air flow laden with wet paint overspray is prevented from passing to the wall surface protected by the air curtain and wet paint overspray from the exhaust air flow is prevented from adhering to this wall surface.

In this way, in particular surfaces exposed to the exhaust air flow laden with wet paint overspray can be permanently protected from adhesion of wet paint overspray.

The amount of air fed to the exhaust air flow overall by means of one or more air curtain producing devices preferably corresponds to approximately 10% to approximately 30% of the amount of exhaust air originating from the application region.

It is particularly favourable if the air fed to the air curtain producing device is cooled, since the cooled air has a higher density than the exhaust air originating from the application region and thus descends towards the wall surface to be protected.

For example, fresh air can be fed by means of the air curtain producing device.

Alternatively, it can also be provided that cleaned exhaust air is fed by means of the air curtain producing device.

In a preferred configuration of the invention it is provided that the wall surface protected by the air curtain is oriented substantially horizontally.

The wall surface protected by the air curtain can in particular be a flow guide surface, which laterally delimits a constriction in the flow path of the exhaust air flow from the application region to the separation device.

In this case, it is preferably provided that the central flow direction of the air curtain is directed towards the constriction, so that the overspray particles are directed through the air curtain towards the constriction and then pass through the constriction to the separation device.

In particular, it can be provided that the constriction delimited by the flow guide surface is at least partially closable by means of the closing device.

The separation device can comprise in particular a regenerable surface filter, i.e. a filter that has a filter surface, on which the wet paint overspray entrained by the exhaust air flow is deposited, and which can be cleaned to remove the paint overspray deposited thereon, preferably during routine operation of the device.

To facilitate the cleaning of the regenerable surface filter, the regenerable surface filter can have a barrier layer comprising a precoat material that prevents the filter surface from becoming clogged. This barrier layer is renewed by a precoating operation after the surface filter has been cleaned and can be reinforced by intermediate precoating operations between the cleaning operations.

A preferred configuration of the device according to the invention comprises at least one closing device, by means of which the flow path of the exhaust air flow from the application region to the separation device can be intermittently closed off at least partially.

The amount of wet paint overspray transported during cleaning and precoating operations from the application region to the separation device and also the amount of precoat material passing to the application region from the region of the separation device during these operations are at least reduced by at least partially closing the flow path of the exhaust air flow between the application region and the separation device during said cleaning operations and/or during said precoating operations.

Moreover, the closing device can also be operated in the case of a malfunction in order to prevent contamination of the objects to be painted in the application region.

Since the flow path of the exhaust air flow from the application region to the separation device is closed off at least partially during the cleaning operations and/or precoating operations, this flow path can be configured such that it has a comparatively large flowable cross-section outside the closing phases; in particular, it is not necessary to provide particularly narrow constrictions with high flow velocity (higher than approximately 2 m/s) in the flow path of the exhaust air flow from the application region to the separation device.

In a preferred configuration of the invention, the closing device comprises at least one closing element and a moving device, by means of which the closing element is movable into the flow path of the exhaust air flow into a closing position and out of the flow path of the exhaust air flow into an open position.

The closing element can be configured to be substantially airtight, for example.

In this case, it is preferably provided that the flow path of the exhaust air flow from the application region to the separation device is only partially closed off during the cleaning and/or precoating operations, so that there always remains at least one gap, through which an exhaust air flow (reduced in the closing phase) can pass from the application region to the separation device. Nevertheless, with this configuration the amount of overspray transported from the application region to the separation device or the amount of precoat material transported out of the region of the separation device to the application region is significantly reduced by the reduction of the exhaust air flow passing through the closing parts.

In particular, the closing element can comprise a sheet metal plate.

In this case, the closing means is preferably configured so that the closing element can be brought into a closing position, in which it is covers approximately 80% at most of the cross-section flowed through by the exhaust air flow when the closing element is located in the open position.

In addition, it can be provided that in the case of a malfunction the closing element can be brought into a further closing position, in which the flow path of the exhaust air flow from the application region to the separation device is completely closed off by the closing element.

Alternatively to an airtight closing element, it can also be provided that the closing element is air-permeable and comprises an air-permeable filter element.

The filter element filters wet paint overspray and precoat material out of the air flow passing through the filter element when the closing element is located in the closing position, so that neither wet paint overspray nor precoat material can pass through the closing element when this is located in the closing position.

When an air-permeable closing element is used, the flow path of the exhaust air flow from the application region to the separation device is preferably closed off completely by the closing element in the closing position.

In a preferred configuration of the invention it is provided that the closing element comprises a support structure, on which the filter element is held.

In particular, it can be provided that the filter element is held by means of a clamping device of a support structure. In this way, a filter element laden with wet paint overspray and/or precoat material can be detached simply from the support structure and replaced by a fresh filter element.

To enable the passage of air through the closing element, it can be provided that the support structure has air passages arranged in a honeycomb configuration.

A particularly stable closing element is obtained if the support structure is formed from a metal material.

The moving means for moving the closing element from the open position into the closing position and back into the open position preferably comprises at least one guide rail for guiding the closing element.

Moreover, the moving device can comprise, for example, an electric, hydraulic or pneumatic drive for the closing element.

In a special configuration of the moving device it is provided that the moving device comprises a circulating transport element, in particular a chain or a toothed belt.

It is particularly favourable if the closing element when in the closing position is configured so that it is accessible by an operator. In this case, the accessible closing element can serve in particular as a starting point for conducting maintenance and/or repair work on a transport device, which transports the objects to be painted through the application region. The walkway gratings that usually delimit the painting cabin to the bottom can be omitted in this case.

When the objects to be painted are transported through the application region by means of a transport device, it is preferably provided that the vertical spacing between the upper side of the closing element when in the closing position and the underside of the objects to be painted amounts to approximately 2 m at most, so that the transport device is readily accessible for an operator standing on the closing element.

To hold the closing element in its closing position in a particularly stable manner, it is preferably provided that the device comprises a support element, against which the closing element is supported in the closing position.

Such a support element can be configured in particular as a vertical partition wall in a flow chamber of the device, against the upper edge of which the closing element is supported.

In order to protect the closing element from contamination by wet paint overspray or by precoat material outside the closing phases, it is favourable if in the open position the closing element is arranged below a flow guide element of the device.

The device according to the invention preferably comprises at least one regenerable surface filter.

In order to provide the regenerable surface filter and/or boundary walls of the flow path of the exhaust air flow with a barrier layer, which prevents wet paint overspray from adhering, it is favourable if the device comprises at least one precoat feeding means, which discharges a precoat material into the exhaust air flow downstream of the closing device.

In this case, the discharge of the precoat material into the exhaust air flow preferably occurs when the closing device at least partially closes off the flow path of the exhaust air flow, so that the closing device prevents the precoat material from passing into the application region of the painting assembly.

In a special configuration of the device according to the invention it is provided that the flow path of the exhaust air flow from the closing device to the separation device has at least one constricted region. The increased flow rate of the exhaust air flow in the constricted region means that practically no precoat material can pass out of the section of the flow path of the exhaust air flow located downstream of the constricted region against the flow direction of the exhaust air flow to the closing device. Therefore, cleaning and precoating operations can be conducted in the section of the flow path located downstream of the constricted region without the flow path of the exhaust air flow from the application region to the separation device being at least partially closed off during these operations. Rather, it is sufficient in this case if the flow path of the exhaust air flow from the application region to the separation device is at least partially closed off by means of the closing device, when precoating operations are conducted in the section of the flow path of the exhaust air flow located between the closing device and the constricted region.

The central flow direction of the exhaust air flow is preferably oriented substantially horizontally during passage through the constricted region.

The device preferably comprises at least one precoat feeding means, which discharges a precoat material into the exhaust air flow downstream of the constricted region. As already stated, the closing device does not have to be brought into the closing position while such a precoat feeding means is being operated.

In a preferred configuration of the device, it is provided that the device comprises at least one receiving container for used precoat material. By collecting used precoat material in such a receiving container, the used precoat material, i.e. precoat material mixed with wet paint overspray, can be supplied for reuse for precoating a filter element or a boundary wall of the flow path of the exhaust air flow.

Such a receiving container is preferably arranged below the separation device and/or below the closing device.

The receiving container can be connected in particular to a precoat storage container by means of a precoat discharge conduit to be able to transfer used precoat material from the receiving container into such a precoat storage container.

At least one precoat storage container can be connected to at least one precoat feeding means, which discharges a precoat material into the exhaust air flow.

This precoat storage container can selectively discharge wet paint-free or wet paint laden precoat material to the precoat feeding means.

The used precoat material collected in the receiving container can be supplied for reuse in a particularly simple manner if the device comprises at least one compressed air nozzle, by means of which precoat material located in the receiving container can be transported out of the receiving container into the flow path of the exhaust air flow.

A particularly energy-saving operation of the painting assembly is enabled if the device has a recirculating air circuit, in which the exhaust air flow, from which the wet paint overspray has been separated, is fed at least partially once again to the application region.

Claim 39 is directed towards an assembly for painting objects, in particular vehicle bodies, which comprises at least one painting cabin and at least one device according to the invention for separating wet paint overspray from an exhaust air flow containing overspray particles.

A further object forming the basis of the present invention is to provide a process for separating wet paint overspray from an exhaust air flow containing overspray particles, wherein the overspray particles pass into the exhaust air flow in an application region of a painting assembly, in which clogging of a wall surface of the device with wet paint overspray is prevented.

This object is achieved by a process which comprises the following process steps:
 1. separating an overspray from at least a part of the exhaust air flow by means of a separation device arranged in a section of a flow chamber, which is arranged below the application region and which is divided into a plurality of sections by at least one flow guide element, and
 2. generating an air curtain on a wall surface, which delimits the flow path of the exhaust air flow and is arranged on the at least one flow guide element.

Further features and advantages of the invention are the subject of the following description and illustrative representation of exemplary embodiments.

BRIEF DESCRIPTION OF THE DRAWINGS

Identical elements or those of equivalent function are given the same reference numerals in all figures.

DETAILED DESCRIPTION OF THE INVENTION

Figure 1:
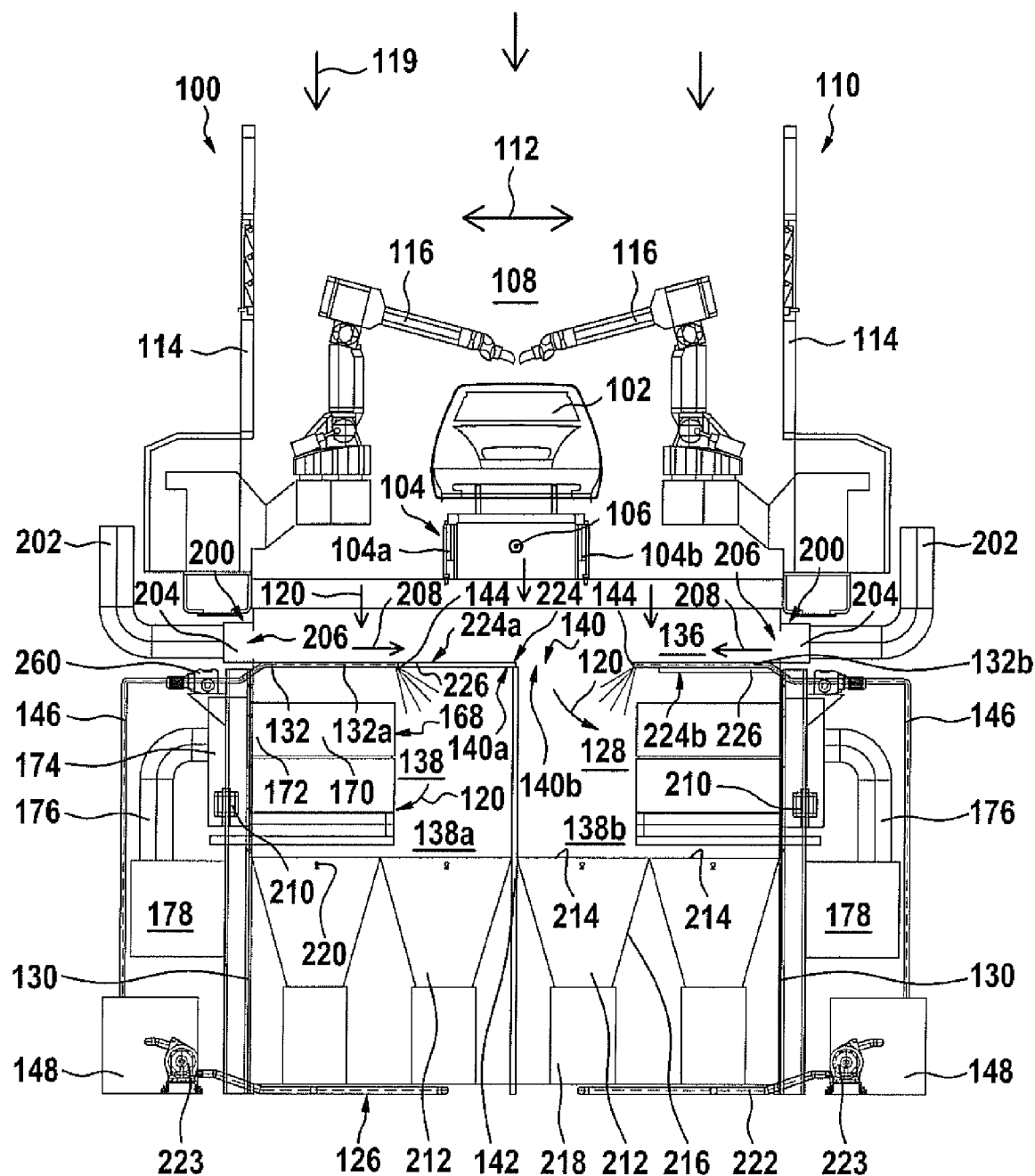
FIG. 1 is a schematic vertical cross-section through a first embodiment of a painting cabin with a device arranged under it for separating wet paint overspray from an exhaust air flow containing overspray particles, which comprises two separation devices for separating the overspray from the exhaust air flow, two closing devices arranged above the separation devices for intermittent closure of the flow path of the exhaust air flow and two air curtain producing devices for generating transverse air curtains on horizontal flow guide surfaces.
Figure 2:
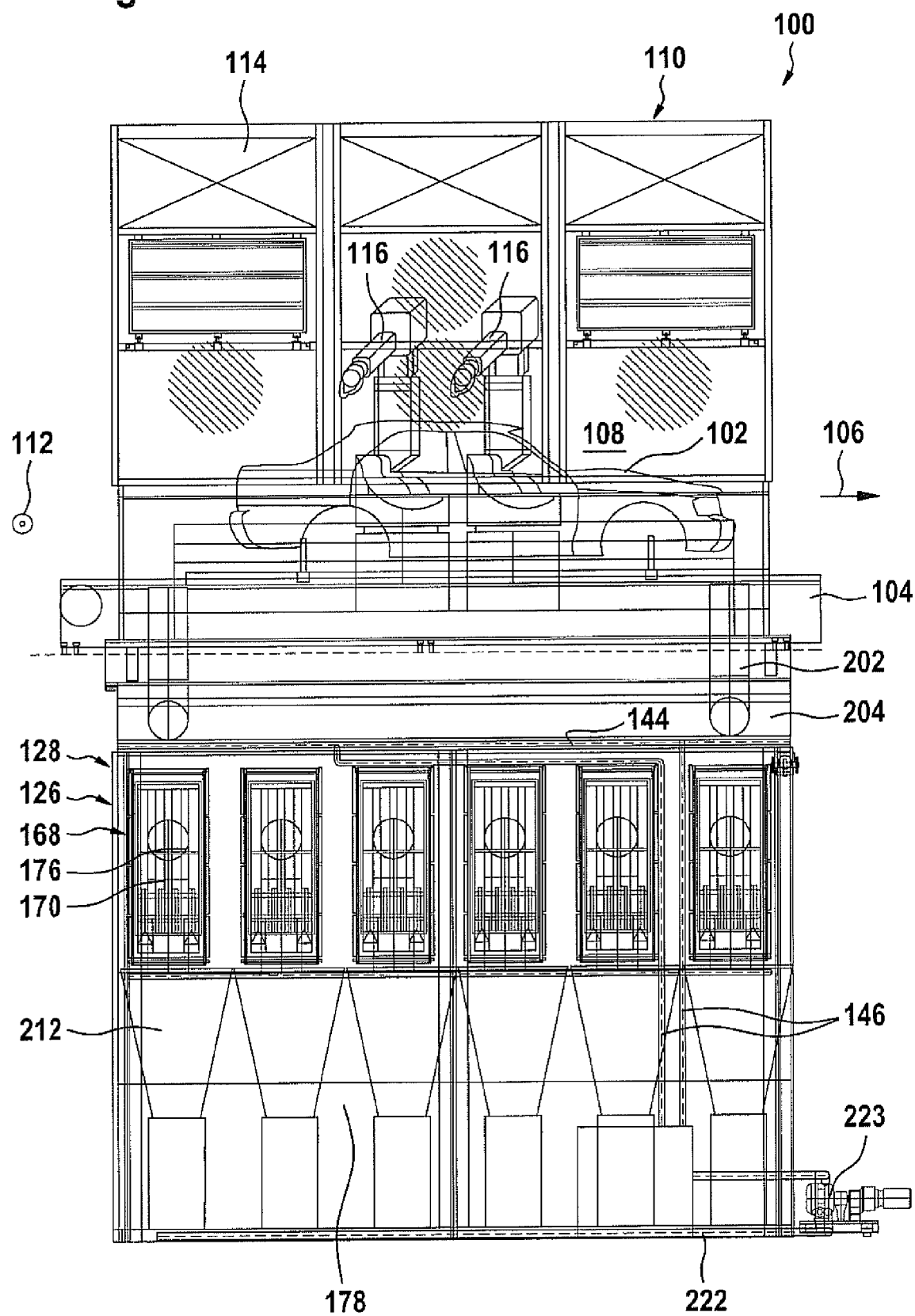
FIG. 2 is a schematic side view of the assembly of FIG. 1.

An assembly, shown in FIGS. 1 to 10 and given the overall reference 100, for spray-painting vehicle bodies 102 comprises a purely schematically represented transport device 104, by means of which the vehicle bodies 102 can be moved in a transport direction 106 through an application region 108 of a painting cabin given the overall reference 110.

The transport device 104 can be configured, for example, as an inverted circular conveyor or also as an inverted monorail conveyor.

Figure 3:
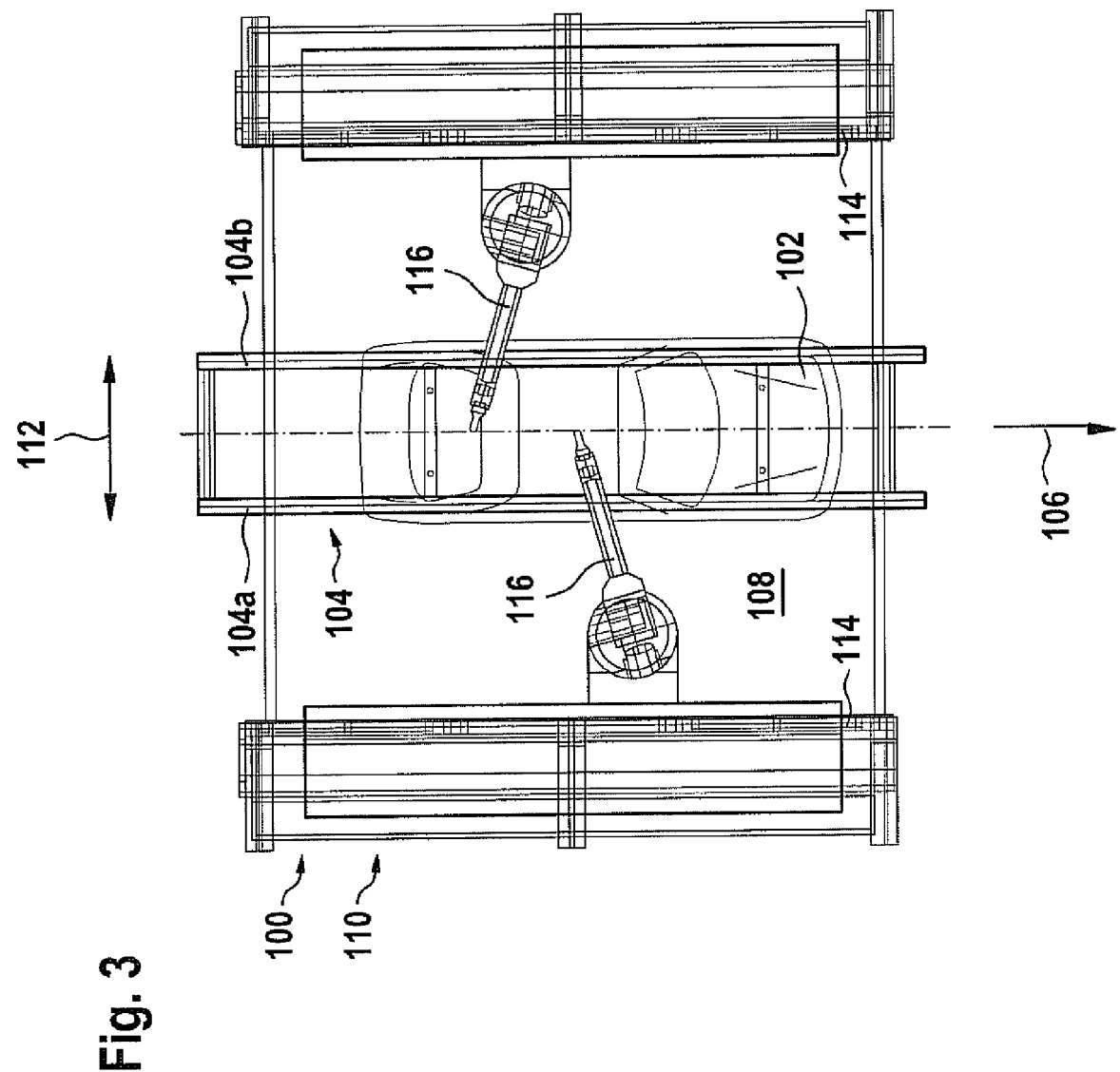
FIG. 3 is a schematic plan view from above onto the assembly from FIGS. 1 and 2.
Figure 4:
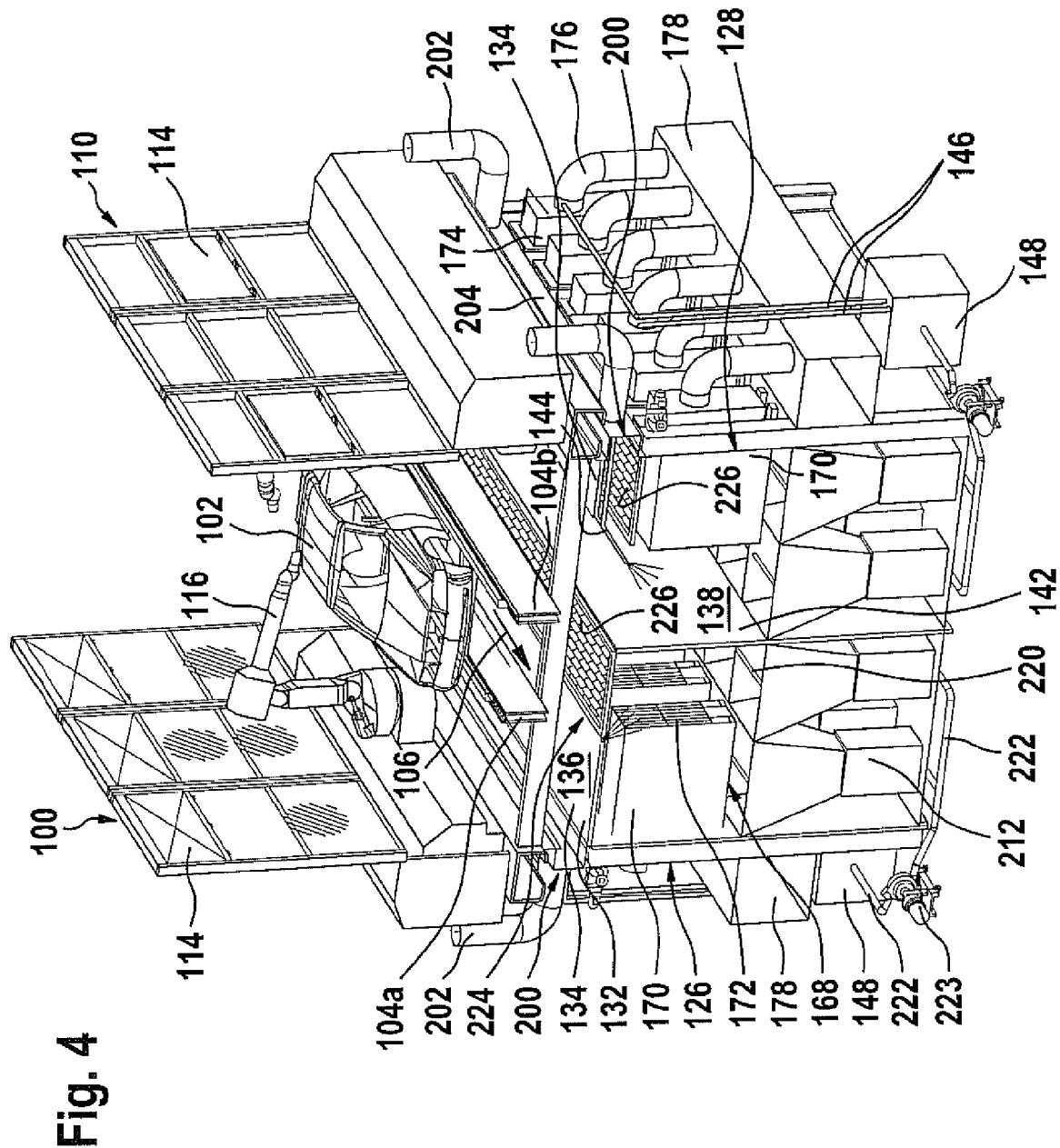
FIG. 4 is a schematic perspective representation of the assembly from FIGS. 1 to 3.

In particular, the transport device 104 can be configured in two parts and—as may best be seen from FIGS. 1, 3 and 4—can comprise two conveyor strands 104a and 104b extending parallel in the transport direction 106 and spaced from one another in a horizontal direction perpendicular to the transport direction 106.

The application region 108 is the interior of the painting cabin 110, which is delimited on both sides of the transport device 104 by a respective cabin wall 114 in its horizontal transverse direction 112 running perpendicularly to the transport direction 106, which corresponds to the longitudinal direction of the painting cabin 110.

Spray-painting devices 116 (see FIGS. 1 to 4), e.g. in the form of painting robots, are arranged on both sides of the transport device 104 in the painting cabin 110.

Figure 10:
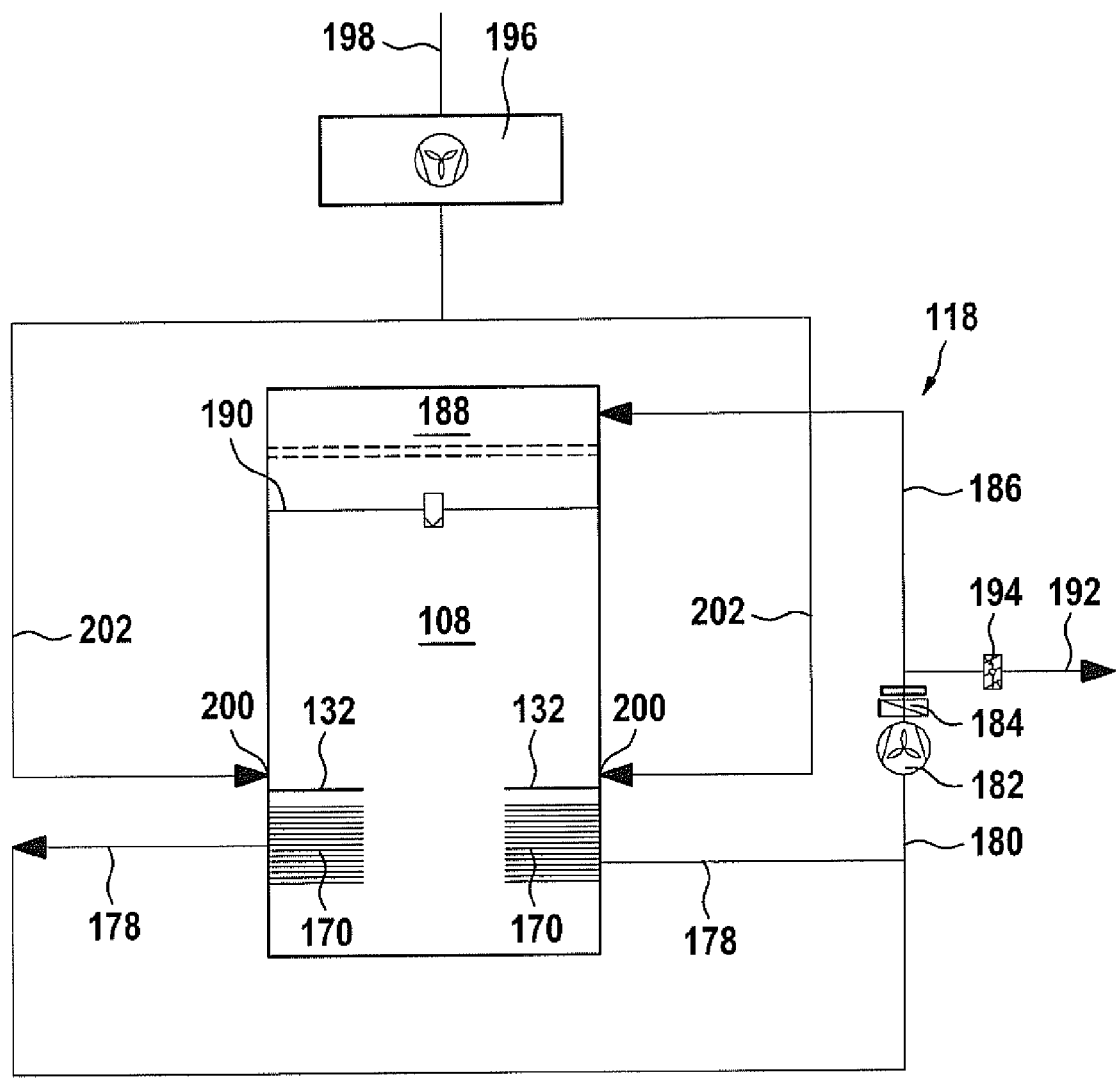
FIG. 10 is a schematic representation of a recirculating air circuit of the assembly from FIGS. 1 to 4, wherein fresh air is fed to the air curtain producing device and exhaust air is discharged from the recirculating air circuit via an exhaust air valve.

An air flow, which passes substantially perpendicularly from the top downwards through the application region 108, as is indicated in FIG. 1 by the arrows 119, is generated by means of a recirculating air circuit 118 shown schematically in FIG. 10.

This air flow takes up paint overspray in the form of overspray particles in the application region 108.

In this case, the term "particles" covers both solid and liquid particles, in particular droplets.

If a wet paint is used for painting in the assembly 100, then the wet paint overspray consists of paint droplets.

Most of the overspray particles have a maximum dimension in the range of approximately 1 µm to approximately 100 µm.

The exhaust air flow shown by arrows 120 exits the painting cabin 110 downwards and passes into a device, given the overall reference 126, for separating wet paint overspray from the exhaust air flow 120, which is arranged below the application region 108.

The device 126 comprises a substantially cuboidal flow chamber 128, which extends beyond the entire length of the painting cabin 110 in the transport direction 106 and is delimited in the transverse direction 112 of the painting cabin 110 by vertical side walls 130, which substantially align with the lateral cabin walls 114 of the painting cabin 110, so that the flow chamber 128 has substantially the same horizontal cross-sectional area as the painting cabin 110 and is arranged substantially completely within the vertical projection of the floor space of the painting cabin 110.

The flow chamber 128 is divided into an upper section 136 and a lower section 138 by flow guide elements 132, which in this exemplary embodiment are configured as substantially horizontally oriented flow baffle plates 134.

The upper section 136 and the lower section 138 of the flow chamber 128 are connected to one another by means of a constriction 140, which is in the form of a gap between the opposing free edges of the flow guide elements 132 and forms a narrowing in the flow path of the exhaust air flow 120 through the flow chamber 128.

The horizontal cross-sectional area of the constriction 140 in this case amounts to approximately 35% to approximately 50% of the horizontal cross-sectional area of the flow chamber 128 at the level of the constriction 140.

The air flow rate of the exhaust air flow 120 in the region of the constriction 140 lies in the range of approximately 0.6 m/s to approximately 2 m/s.

The lower section 138 of the flow chamber 128 is divided by a vertical partition wall 142 running parallel to the transport direction 106 into a left sub-section 138*a* and a right sub-section 138*b*.

A precoat feeding means 144 in the form of a precoating lance extending in the transport direction 106 is respectively integrated into the edge of each of the flow guide elements 132 on the constriction side.

Each of the precoating lances has a diameter of approximately 30 mm, for example, and is provided with a plurality of atomiser nozzles, which are arranged at a spacing of approximately 50 mm to approximately 100 mm in the longitudinal direction of the precoating lance and have an orifice size in the range of approximately 3 mm to approximately 15 mm.

These atomiser nozzles of the precoating lances discharge a precoat material in the form of a spray mist at intervals into the exhaust air flow 120.

The precoat feeding means 144 are respectively connected by means of one or more precoat feed conduits 146 to a respective precoat storage container 148, in which the precoat material is stored in flowable state.

In principle, any material capable of absorbing the liquid component of the wet paint overspray can be used as precoat material.

In particular, lime, rock meal, aluminium silicates, aluminium oxides, silicon oxides, powdered paint or similar are conceivable as precoat materials, for example.

The precoat material consists of a plurality of precoat particles, which have an average diameter in the range of approximately 10 µm to approximately 100 µm, for example.

Figure 8:
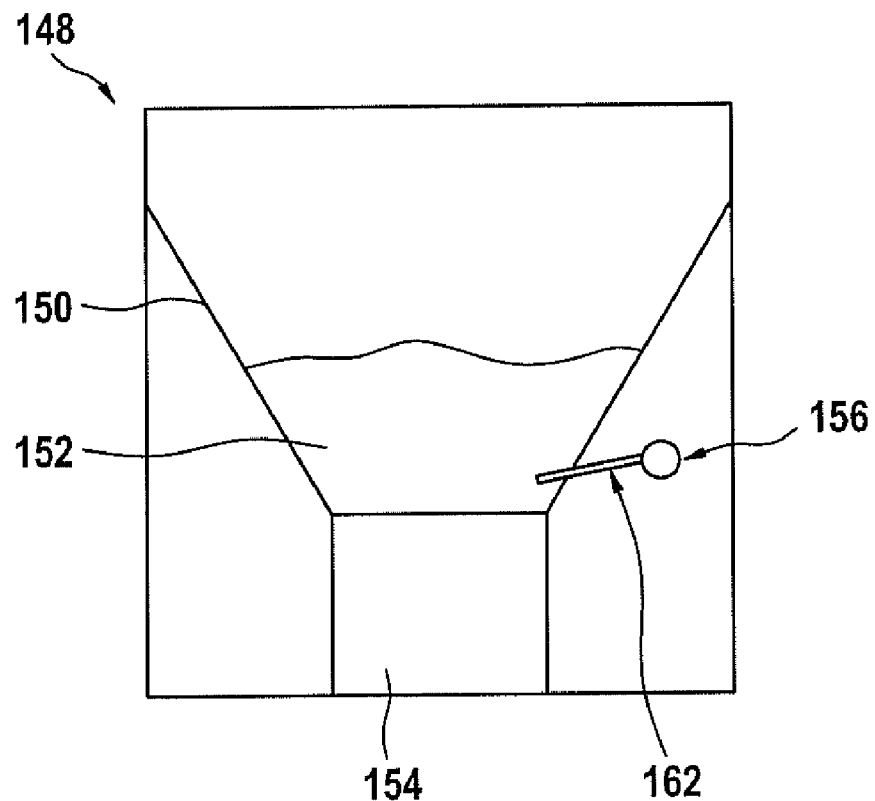
FIG. 8 is a schematic view in vertical section through a precoat storage container.

The structure of one of the precoat storage containers 148 is shown in detail in FIG. 8.

Located inside the precoat storage container 148 is a storage chamber 150, which is tapered downwards in the shape of a funnel and contains a fluid bed 152 of flowable precoat material arranged above a compressed air chamber 154.

Figure 9:
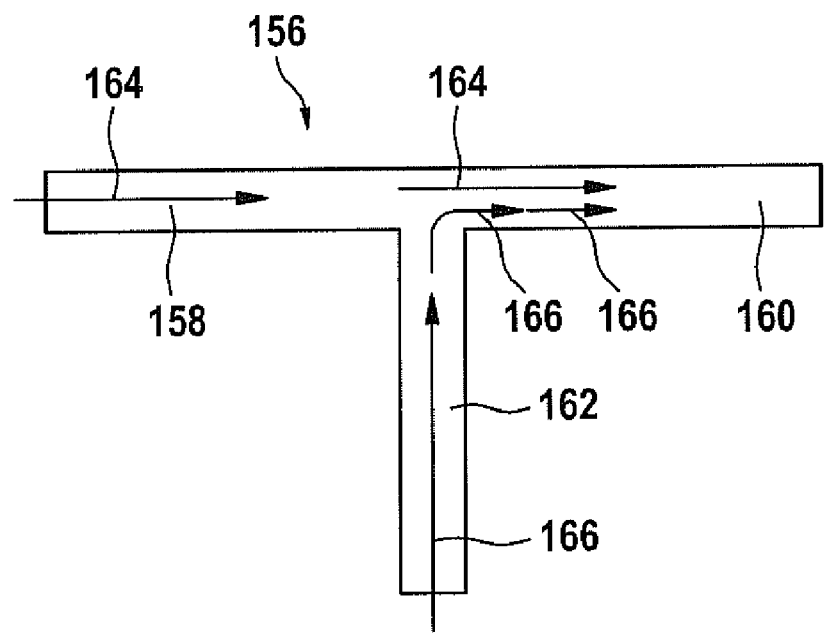
FIG. 9 is a schematic sectional view through an injector for precoat material.

The precoat material is conveyed out of the storage chamber 150 of the precoat storage container 148 by means of an injector 156, which is shown in detail in FIG. 9.

The injector 156 has the shape of a T-section with a compressed air connection 158, a connection 160 for a precoat feed conduit 146 and with a lance jet 162, which projects into the fluid bed 152 in the storage chamber 150.

For transporting precoat material, compressed air with a pressure of approximately 5 bar, for example, is passed through the injector 156 from its compressed air connection 158 towards the connection 160 for the precoat feed conduit 146; this compressed air flow is indicated by the arrows 164 in FIG. 9.

This compressed air flow results in a suction effect, as a result of which the fluidised precoat material is sucked out of the fluid bed 152 through the lance jet 162 into the injector 156 and passes through the connection 160 into the precoat feed conduit 146.

The precoat material flow through the injector 156 is indicated by the arrows 166 in FIG. 9.

A respective separation device 168 for separating wet paint overspray from the exhaust air flow 120 is provided in the sub-sections 138*a*, 138*b* of the lower section 138 of the flow chamber 128 on both sides of the constrictions 140. The separation devices 168 respectively comprise a plurality of regenerable surface filters 170, which are arranged on the two opposing vertical side walls 130 of the flow chamber 128 and are spaced from one another in the transport direction 106, and which project with their filter elements 172 into the lower section 138 of the flow chamber 128 (see in particular FIGS. 1, 2 and 4).

Each of the regenerable surface filters 170 comprises a hollow base body, on which a plurality of, e.g. substantially plate-shaped, filter elements 172 are held.

The filter elements 172 can be configured, for example, as plates made of sintered polyethylene, which are provided on their outer face with a membrane of polytetrafluoroethylene (PTFE).

The PTFE coating serves to increase the filtering grade of the surface filter 170 (i.e. to reduce its permeability) and moreover prevent permanent adhesion of the wet paint overspray deposited from the exhaust air flow 120.

Both the base material of the filter elements 172 and their PTFE coating have a porosity, so that the exhaust air can pass through the pores into the interior of the respective filter element 172.

In order to prevent the filter surfaces from clogging, these are additionally provided with a barrier layer of precoat material discharged into the exhaust air flow.

During operation of the device 126 this barrier layer is formed by deposition of the precoat material discharged into the exhaust air flow 120 on the filter surfaces and prevents the filter surfaces from clogging as a result of adhering wet lack overspray.

Precoat material from the exhaust air flow 120 is also deposited on the boundary walls of the lower section 138 of the flow chamber 128, where it also prevents wet paint overspray from adhering.

The exhaust air flow 120 passes over the filter surfaces of the filter elements 172 of the regenerable surface filters 170, wherein both the entrained precoat material and the entrained wet paint overspray are deposited on the filter surfaces, and passes through the porous filter surfaces into the interiors of the filter elements 172, which are connected to a cavity inside a base body 174 of the respective surface filter 170.

The cleaned exhaust air flow 120 thus passes through the base body 174 into a respective exhaust air pipe 176, which leads from the respective regenerable surface filter 170 to an exhaust air duct 178 running laterally next to a vertical side wall 130 of the flow chamber 128 and parallel to the transport direction 106.

As may be seen from the schematic representation of FIG. 10, the exhaust air cleaned of the wet paint overspray passes out of the two exhaust air ducts 178 through an exhaust air collector conduit 180 to a recirculation fan 182, and from there the cleaned exhaust air is fed via a cooling battery 184 and a feed conduit 186 to an air chamber 188, the so-called plenum, arranged above the application region 108.

From the air chamber 188, the cleaned exhaust air passes back into the application region 108 via a filter cover 190.

An exhaust air conduit 192, which is completely or partially closable by means of an exhaust air valve 194, branches off from the feed conduit 186.

The portion of the cleaned exhaust air flow passing through the exhaust air valve 194 and the exhaust air conduit 192 is discharged to the environment (for example, via a flue).

This portion of the exhaust air flow discharged to the environment is replaced by fresh air, which is fed to an inlet air system 196 via a fresh air feed conduit 198.

The fresh air from the inlet air system 196 is fed into the flow chamber 128 by means of two air curtain producing devices 200, which are connected to the inlet air system 196 by means of a respective inlet air conduit 202.

As may best be seen in FIG. 1, each of the air curtain producing devices 200 comprises a respective inlet air chamber 204, which extends in the transport direction 106, is fed with inlet air from the inlet air system 196 via the inlet air conduits 202 and opens into the upper section 136 of the flow chamber 128 via a gap 206, which extends in the transport direction 106 and has an extent in vertical direction in the range of approximately 15 cm to approximately 50 cm, for example.

The gap 206 of each inlet air chamber 204 is respectively arranged slightly above one of the flow guide elements 132, so that as a result of the inflow of the inlet air from the inlet air chamber 204 in substantially horizontal direction along the flow guide element 132 into the flow chamber 128 on the upper side of the flow guide element 132 an air curtain is formed, which is directed from the air curtain producing device 200 to the constriction 140 between the flow guide elements 132 and thus prevents the exhaust air flow 120 laden with the wet paint overspray from passing out of the application region 108 to the upper side of the flow guide elements 132 and prevents the wet paint overspray from the exhaust air flow 120 from depositing on the upper side of the flow guide elements 132.

The central flow direction of the air in the transverse air curtain formations generated by the air curtain producing devices 200 at the flow guide element 132 is illustrated by arrows 208 in FIG. 1.

Because the air flow in the transverse air curtain formations is directed towards the constriction 140 between the flow guide elements 132, any overspray particles deposited on the upper side of the flow guide elements 132 are moved towards the constriction 140 and are entrained there by the exhaust air flow 120 into the lower section 138 of the flow chamber 128.

The amount of air per unit time fed to the interior of the flow chamber 128 respectively by means of one of the air curtain producing devices 200 amounts to approximately 5% to approximately 15% of the amount of air per unit time contained in the exhaust air flow 120 from the application region 108.

The inlet air system 196 comprises a cooling battery (not shown), by means of which the air fed to the air curtain producing devices 200 is cooled so that it is colder than the exhaust air flow 120 exiting from the application region 108, which causes the air supplied by means of the air curtain producing device 200 to drop downwards in the flow chamber 128, i.e. towards the surfaces of the flow guide elements 132 to be protected.

As this cooled inlet air flows further through the lower section 138 of the flow chamber 128, through the exhaust air ducts 178 and through the exhaust air collector conduit 180, this cooled inlet air mixes with the exhaust air flow 120 from the application region 108, so that the warming of the cleaned exhaust air fed once again to the application region 108 via the feed conduit 186 is partially compensated by the recirculation fan 182.

This compensation as a result of the air fed by means of the air curtain producing device 200 is supplemented by the cooling of the air exiting from the recirculation fan 182 by means of the cooling battery 184.

A large portion of the air directed through the application region 108 is therefore directed in a recirculating air circuit 118, which comprises the application region 108, the flow chamber 128, the exhaust air ducts 178, the exhaust air collector conduit 180, the recirculation fan 182, the feed conduit 186 and the air chamber 188 above the application region 108, wherein a constant heating of the air directed in the recirculating air circuit is prevented by the supply of fresh air by means of the air curtain producing devices 200 and also by the cooling by means of the cooling battery 184.

The mean flow rate of the air in the exhaust air collector conduit 180 and in the feed conduit 186 lies in the range of approximately 6 m/s to approximately 12 m/s.

Since the separation of the wet paint overspray from the exhaust air flow 120 by means of the regenerable surface filters 170 is dry, i.e. occurs without washing with a cleaning fluid, the air directed in the recirculating air circuit 118 is not moistened during the separation of the wet paint overspray, and therefore no devices whatsoever are required to dehumidify the air directed in the recirculating air circuit 118.

Moreover, no devices are necessary to separate wet paint overspray from a cleaning fluid used for washing.

The regenerable surface filters 170 are cleaned by compressed air pulses at specific time intervals when their load of wet paint overspray has reached a predetermined dimension.

The cleaning can be conducted, for example, once to six times per 8 hour work shift, approximately every one to 8 hours (depending on the increase in pressure loss at the surface filters 170).

The necessary compressed air pulses are generated by means of a pulsing unit 210, which is arranged on the base body 174 of the respective regenerable surface filter 170, and which is able to supply compressed air pulses to compressed air pipes, which run inside the respective base body 174 and lead from the pulsing unit 210 into the interiors of the filter elements 172.

From the interiors of the filter elements 172 the compressed air pulses pass through the porous filter surfaces into the outer area of the filter elements 172, wherein the barrier layer of precoat material formed on the filter surfaces and the wet paint overspray deposited thereon is detached from the filter surfaces, so that the filter surfaces are returned to their cleaned original state.

The compressed air store in the pulsing units 210 is supplemented by means of compressed air feed conduits (not shown) from an on-site compressed air supply network.

After the cleaning, a new barrier layer is generated on the filter surfaces by adding precoat material to the exhaust air flow 120 by means of the precoat feeding means 144, wherein the barrier layer can consist of 100% wet paint-free precoat material or also of wet paint-laden precoat material.

The material containing wet paint cleaned from the filter surfaces of the regenerable surface filters 170 passes into precoat receiving containers 212, a plurality of which are arranged in the lower section 138 of the flow chamber 128 so that their upwardly facing openings 214 substantially cover the entire horizontal cross-section of the flow chamber 128. In this way, it is ensured that all the material removed from the surface filters 170 by cleaning as well as the precoat and overspray material already separated from the exhaust air flow 120 before reaching the surface filters 170 passes into the precoat receiving containers 212.

Each of the precoat receiving containers 212 comprises an upper part 216, which tapers downwards in a funnel shape, and also a substantially cuboidal lower part 218.

The side walls of the upper part 216 of the precoat receiving container 212 inclined towards one another in a funnel shape enclose a funnel angle of approximately 50° to approximately 70° with one another.

Close to the upper opening 214, each upper part 216 of a precoat receiving container 212 is provided with a compressed air lance 220 crossing the upper part 216, by means of which lance the material located in the upper part 216 of the precoat receiving container 212 can be subjected to a compressed air pulse and thus swirled.

The swirled material can pass upwards through the opening 214 and can be deposited, for example, on the filter surfaces of the regenerable surface filters 170 or on the vertical partition wall 142, which is protected from the adhesion of wet paint overspray from the exhaust air flow 120 by the coating with the precoat material.

From the lower parts 218 of the precoat receiving containers 212 the material contained therein, a mixture of precoat material and wet paint overspray, can be transported respectively through a suction pipe 222, in which a precoat suction pump 223 is arranged, respectively into one of the precoat storage containers 148 to be supplied from there—as described above—through the precoat feed conduit 146 for reuse as precoat material.

Besides the precoat storage containers 148, from which wet paint-laden precoat material is fed to the precoat feed conduit 146, the device 126 can also comprise further precoat storage containers that are not connected to the precoat receiving containers 212, but are filled with wet paint-free precoat material in order to selectively feed wet paint-free precoat material to the precoat feed conduit 146.

This intermediate precoating of the surface filters 170 and the vertical partition wall 142 can be conducted, for example, at time intervals of approximately 15 minutes to approximately 1 hour.

Figure 5:
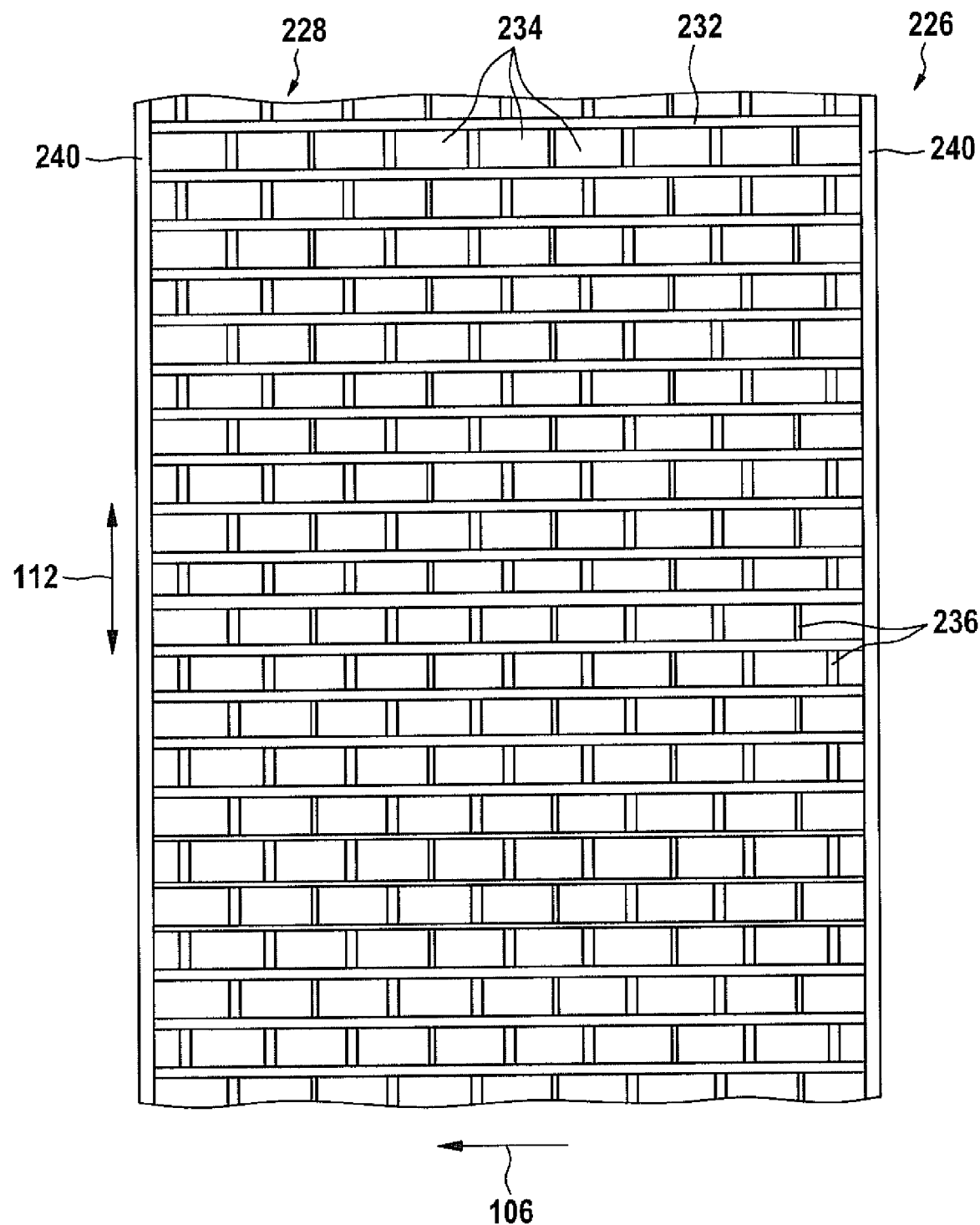
FIG. 5 is a schematic plan view from above onto a support structure of a closing element of a closing device of the assembly from FIGS. 1 to 3.
Figure 6:
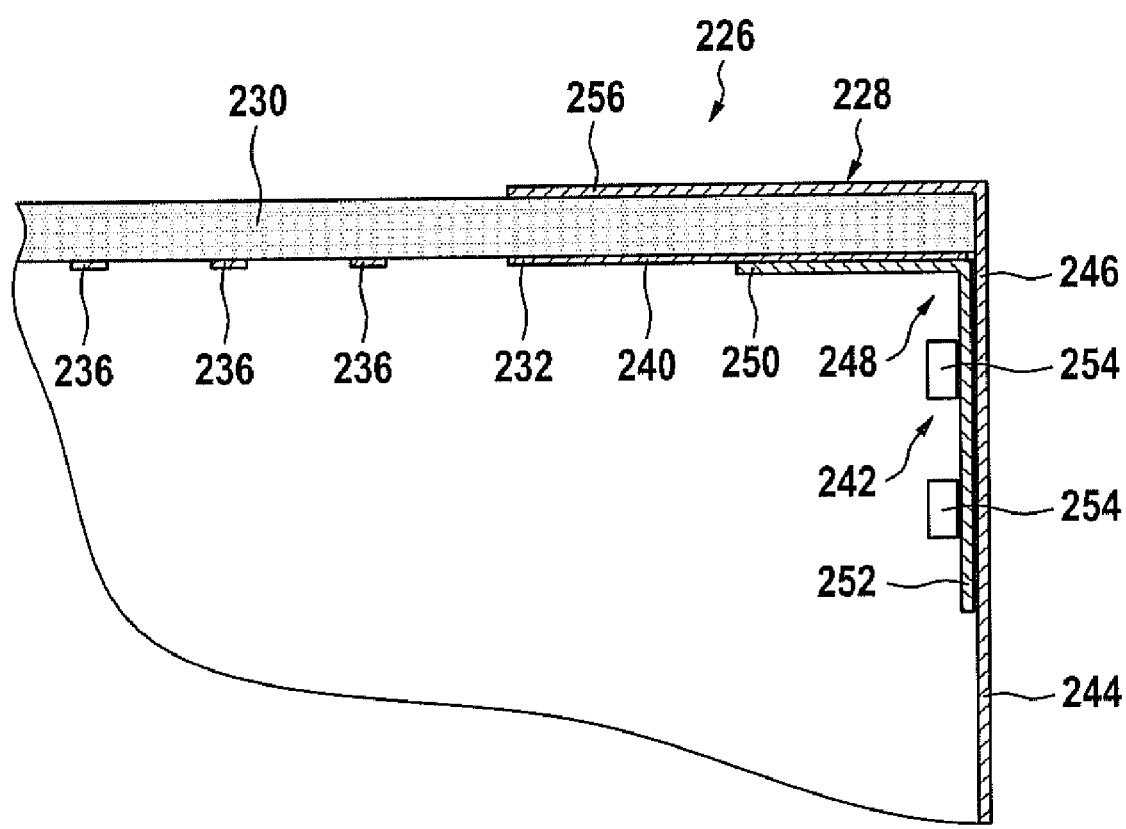
FIG. 6 is a schematic vertical cross-section through a closing element of a closing device of the assembly from FIGS. 1 to 4.
Figure 7:
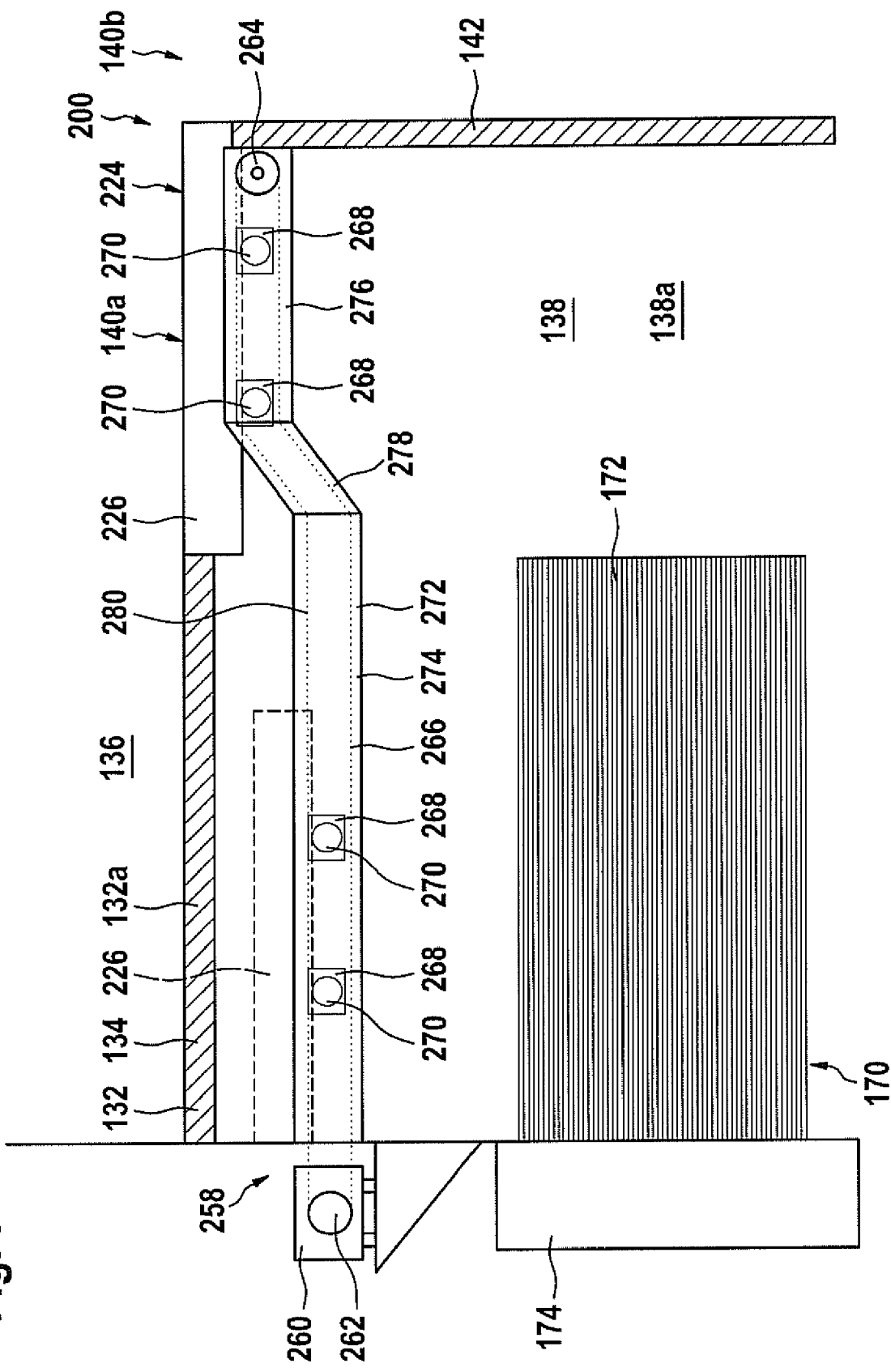
FIG. 7 is a schematic side view of a closing device of the assembly from FIGS. 1 to 4.

In order to prevent precoat material from passing through the constriction 140 into the application region 108 or wet paint overspray from passing through the constriction 140 to the surface filters 170 during these intermediate precoating operations or during the cleaning operation and the subsequent precoating of the surface filters 170, the constriction 140 is closed during these operations by means of two closing devices 224, of which one is shown in detail in FIGS. 5 to 7.

A left (closed in FIG. 1) closing device 224*a* serves to close a left section 140*a* of the constriction 140, which is delimited on one side by the right edge of the left flow guide element 132*a* and on the other side by the upper edge of the vertical partition wall 142.

The right (open in FIG. 1) closing device 224*b* serves to close a right section 140*b* of the constriction 140, which is delimited on one side by the left edge of the right flow guide element 132*b* and on the other side by the upper side of the vertical partition wall 142.

Each of the closing devices 224 respectively comprises a closing element 226 with a support structure 228 made of a metal material and a filter element 230 held on the support structure 228 by clamping action.

As may best be seen from FIGS. 5 and 6, the support structure 228 comprises a substantially plane plate 232, which is provided with a pattern of air passages 234 arranged in a honeycomb configuration.

The plate 232 can be formed in particular from a galvanised steel material or a special steel material.

The material thickness of the plate 232 amounts to approximately 4 mm, for example.

The extent of the air passages 234 in the transverse direction 112 amounts to approximately 40 mm, for example. The extent of the air passages 234 in the transport direction 106 amounts to approximately 80 mm, for example.

The substantially rectangular air passages 234 are arranged in a plurality of consecutive rows in transverse direction 112, wherein the air passages 234 of one row are offset relative to the air passages 234 of the two adjacent rows, e.g. are approximately offset by half the extent of the air passages 234 in the transport direction 106.

The air passages 234 in the plate 232 are separated from one another by webs 236 located between them, which extend in the transverse direction 112 or in the transport direction 106 and respectively have a width of approximately 8 mm, for example.

On its lateral edges the plate 232 is provided with a respective edge region 240, which is not provided with air passages and has a width of approximately 30 mm, for example.

A filter element 230 having the form of a filter mat lies on the plate 232 and is supported on the webs 236 of the plate 232 and also on the edge regions 240 of the plate 232.

The filter element 230 can be configured as a glass-fibre mat, for example, which is air-permeable and has a thickness of approximately 50 mm to approximately 100 mm, for example.

The weight per unit area of the filter element 230 can amount to approximately 220 g/m² to approximately 350 g/m², for example.

Suitable filter elements 230 are sold, for example, by Freudenberg Vliesstoffe KG, 69465 Weinheim, Germany under the name "Farbnebelabscheider (Paint Mist Arrestor) Typ PS50" or "Farbnebelabscheider (Paint Mist Arrestor) Typ PS100".

While the air-permeable filter element 230 and the plate 232 with the air passages 234 allow air to pass through the closing element 226, precoat material entrained in the air or wet paint overspray entrained therein is held back by the filter element 230, so that neither precoat material nor wet paint overspray can pass through the closing element 226.

To secure the filter element 230 to the support structure 228 by clamping action, the closing element 226 comprises a plurality of clamping means 242 arranged on angled frame profiles 244, which respectively have a vertical leg 246 and a horizontal leg 256 engaging over the plate 232 and the filter element 230 and extend along the edges of the plate 232.

Each of these clamping means 242 comprises an angle element 248 with a horizontal leg 250 and a vertical leg 252, wherein the horizontal leg 250 is secured to the edge region 240 of the plate 232 and the vertical leg 252 is provided with a vertical elongated hole (not evident from the representation in FIG. 6).

A plurality of, e.g. two, clamping screws 254, which are screwed into threaded holes on the frame profile 244, engage into this vertical elongated hole, so that the frame profile 244 is displaceable in vertical direction relative to the vertical leg 252 of the angle element 248 and can be clamped in a desired position by tightening the clamping screws 254.

If the frame profile 244 is clamped in a lower clamping position relative to the angle element 248, then the horizontal leg 256 of the frame profile 244 exerts a pressure on the edge region of the filter element 230, so that the filter element 230 is firmly clamped between the frame profile 244 and the plate 232 of the support structure 228.

The clamping of the filter element 230 to the support structure 228 is detachable in order to replace the filter element 230 with a new filter element 230 after a certain period of operation.

By means of a moving device 258 shown in FIG. 7 the above-described closing element 226 is movable from an open position, in which the closing element 226 is arranged below the flow guide element 132 (shown in broken lines in FIG. 7), into a closing position, in which the closing element 226 closes its associated section 140a of the constriction 140 (shown in solid lines in FIG. 7).

The moving device 258 comprises an electric motor 260, which can actuate a driving toothed wheel 262 to perform a rotational movement, and also a toothed belt 266 laid around the driving toothed wheel 262 and a return toothed wheel 264 (and possibly further return toothed wheels, not shown). Secured at the upper run 280 of the toothed belt 266 are two receiving plates 268 spaced from one another in the longitudinal direction of the toothed belt, on which substantially cylindrical journals 270 projecting from a frame profile 244 of the closing element 226 in the transport direction are disposed to pivot around their horizontal axes.

The toothed belt 266 follows the course of a guide rail 272, which has a lower section 274, on which the closing element 226 is laterally guided in the open position, an upper section 276, on which the closing element 226 is laterally guided in the closing position, and a central section 278 inclined relative to the horizontal that connects the upper section 276 to the lower section 274.

When the closing element 226 is located in the open position (shown in broken lines in FIG. 7), then the closing element 226 can be moved out of this open position into the closing position (shown in solid lines in FIG. 7) by the electric motor 260 rotating the driving toothed wheel 262 in clockwise direction, so that the upper run 280 of the toothed belt 266 moves to the right with the receiving plates 268 secured thereon, wherein the closing element 226 held to pivot on the receiving plates 268 by means of the journals 270 is pulled along to the right by the receiving plates 268. In this case, the closing element 226 is guided on the guide rail 272, so that with the closing movement the closing element 226 moves the central section 278 of the guide rail 272 up into the upper section 276 of the guide rail 272 until the closing position is reached, in which the closing element 226 completely covers the section 140a of the constriction 140, and thus abuts against the front edge of the flow guide element 132 with its rear edge and lies on the upper side of the vertical partition wall 142 with its front edge, so that the closing element 226 is supported to the bottom by the vertical partition wall 142 in the closing position.

The metal support structure 228, the guidance of the closing element 226 on the guide rail 272 and the vertical partition wall 142 have such a mechanical strength that the closing element 226 is accessible by an operator when in the closing position in order to perform maintenance or repair work on the transport device 104, for example.

For this purpose, the spacing between the upper side of the closing element 226 in the closing position, on the one hand, and the lower edge of the vehicle bodies 102 transported by the transport device 104 amounts to approximately 1.5 m to approximately 2 m.

Because the closing element 226 is accessible in the closing position, it is not necessary to provide the otherwise usual walkway gratings, which delimit the application region 108 of the painting cabin 110 to the bottom.

As already stated, the exhaust air flow 120 can continue to flow through the closing element 226 in the closing position. However, the closing element 226 constitutes a clearly higher flow resistance than the unclosed constriction 140, and therefore the volume flow through the closing element 226 is significantly smaller than the volume flow through the unclosed section 140a of the constriction 140.

Precoat material or wet paint overspray coming from the lower section 138 of the flow chamber 128 is filtered out during closing phase by the filter element 230 of the closing element 226 and can therefore not pass into the application region 108.

Wet paint overspray coming from the upper section 136 of the flow chamber 128 is filtered out during the closing phase by the filter element 230 of the closing element 226 and can therefore not reach the surface filters 170.

Therefore, during the closing phase, the regenerable surface filters 170 can be cleaned without precoat material and wet paint overspray that has been removed by cleaning being able to pass upwards out of the lower section 138 of the flow chamber 128 or wet paint overspray being able to pass downwards out of the upper section 136 of the flow chamber 128.

Moreover, the closing element 226 can also be brought into the closing position if the surface filters 170 and/or the walls delimiting the lower section 138 of the flow chamber 128 are to be coated with precoat material by the precoat feeding means 144 and/or by precoat material from the precoat receiving containers 121 being swirled by means of the compressed air lances 220. Similarly, during such precoating phases no precoat material can pass through the closing element 226 located in the closing position out of the lower section 138 of the flow chamber 128 upwards into the application region 108.

After the cleaning phase or precoating phase has ended, the closing element 226 is moved back into the open position by the driving toothed wheel 262 being driven in counterclockwise direction by the electric motor 260, as a result of which the upper run 280 of the toothed belt 266 with the receiving plates 268 secured thereto is moved to the left and thus pulls the closing element 226 back into the open position (shown in broken lines in FIG. 7).

The two closing devices 224 for the left section 140a of the constriction 140 and for the right section 140b of the constriction 140 can be operated simultaneously or at staggered times.

In the first case, both sections 140a, 140b of the constriction 140 are closed simultaneously to perform cleaning or precoating operations in the two sub-sections 138a, 138b of the lower section 138 of the flow chamber 128 at the same time.

In the latter case, the sections 140a, 140b of the constriction 140 are closed at different times to perform cleaning or precoating operations in the two sub-sections 138a, 138b of the lower section 138 of the flow chamber 128 at staggered times.

Instead of an air-permeable closing element 226 with a filter element 230, a completely closed, airtight closing element can also be used.

Such an airtight closing element can comprise, for example, a completely closed metal plate without air passages.

In this case, the respective section 140a, 140b of the constriction 140 is not completely closed by the closing element 226. Rather, in this case the airtight closing element is brought into a closing position, in which it does not completely cover the respective section 140a, 140b of the constriction 140 to be closed, but leaves a gap open with a width of approximately 500 mm to approximately 700 mm, for example, for passage of the exhaust air flow 120 through the constriction 140.

In this case, because of the narrowing of the constriction the amount of precoat material passing upwards through the constriction 140 and also the amount of wet paint overspray passing downwards through the constriction 140 is significantly reduced by the partial closure of the section 140a or 140b of the constriction 140.

The closing time of the closing devices 224 amounts to approximately 2 minutes to approximately 6 minutes, for example, in the case of a cleaning and new precoating operation and approximately 1 minute to approximately 2 minutes, for example, in the case of an intermediate precoating operation.

Figure 11:
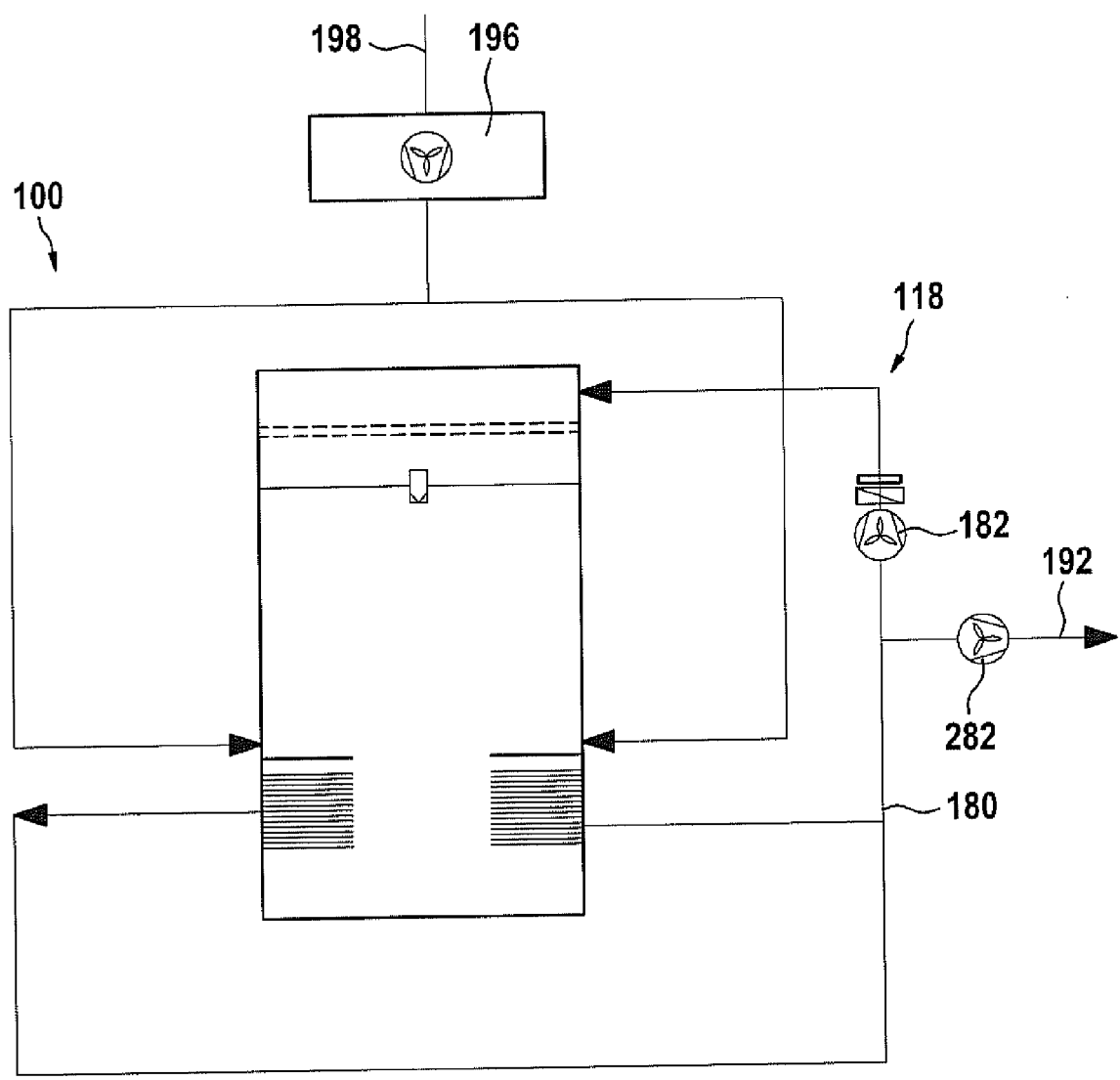
FIG. 11 is a schematic representation of an alternative recirculating air circuit, in which exhaust air is discharged from the recirculating air circuit by means of an exhaust air fan.

A second embodiment, shown in FIG. 11, of an assembly 100 for painting vehicle bodies 102 differs from the above-described first embodiment only in that the exhaust air conduit 192, by means of which exhaust air is removed from the recirculating air circuit 118 and discharged to the environment, does not branch from the feed conduit 186 arranged downstream of the recirculation fan 182, but from the exhaust air collector conduit 180 arranged upstream of the recirculation fan 182.

Moreover, in this embodiment instead of an exhaust air valve 194 an exhaust air fan 282 is provided in the exhaust air conduit 192.

This configuration provides the advantage that an air flow directed vertically from the top downwards through the application region 108 and the flow chamber 128 can also be maintained by means of the inlet air system 196 and the exhaust air fan 282 if the recirculation fan 182 were to fail. By maintaining such a vertical air flow through the application region 108, particles are prevented from rising from the flow chamber 128 into the application region 108 and contaminating the vehicle bodies 102 located there.

Otherwise, the structure and function of the second embodiment shown in FIG. 11 are the same as in the first embodiment shown in FIGS. 1 to 10, and on this basis reference is made to the above description thereof.

Figure 12:
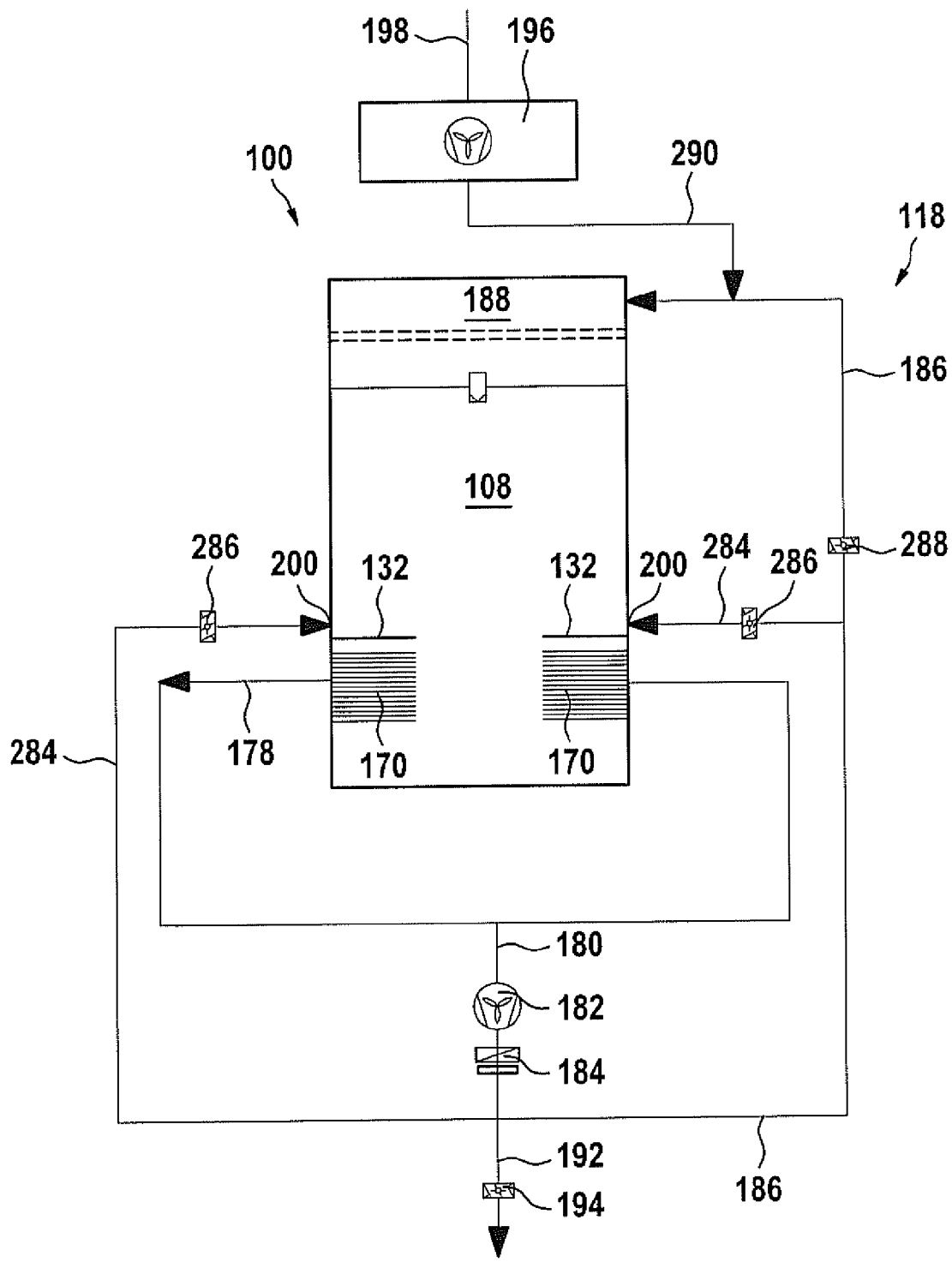
FIG. 12 is a schematic representation of a recirculating air circuit, in which cooled exhaust air is fed to the air curtain producing devices and, moreover, exhaust air is discharged out of the recirculating circuit via an exhaust air valve.

A third embodiment, shown in FIG. 12, of an assembly 100 for painting vehicle bodies 102 only differs from the above-described first embodiment in that the air curtain producing devices 200 are not fed with fresh air coming from the inlet air system 196, but instead are fed with cleaned exhaust air which is branched off from the recirculating air circuit 118.

For this purpose, the air curtain producing devices 200 are connected by a respective branch conduit 284 to the feed conduit 186, which leads from the recirculation fan 182 and the cooling battery 184 connected behind this to the air chamber 188 above the application region 108.

Control valves 286 are arranged in the branch conduits 284 and a control valve 288 is also arranged in the feed conduit 186 downstream of the branches of the branch conduits 284, so that the recirculating air flow can be divided, as required, between the air curtain producing devices 200, on the one hand, and the air flow passing through the air chamber 188 and the application region 108.

The control valves 286, 288 are preferably adjusted so that the amount of air passing through the air curtain producing devices 200 per unit time amounts to approximately 5% to approximately 15% of the amount of air passing through the application region 108.

In this embodiment, the amount of exhaust air removed from the recirculating air circuit 118 via the exhaust air conduit 192 with the exhaust air valve 194 is replaced by fresh air coming from the inlet air system 196 being fed to the recirculating air circuit 118 via a feed conduit 290, which opens into the feed conduit 186 downstream of the control valve 288.

This embodiment does not require an additional exhaust air fan.

Otherwise, the structure and function of the third embodiment shown in FIG. 12 are the same as in the first embodiment shown in FIGS. 1 to 10, and on this basis reference is made to the above description thereof.

Figure 13:
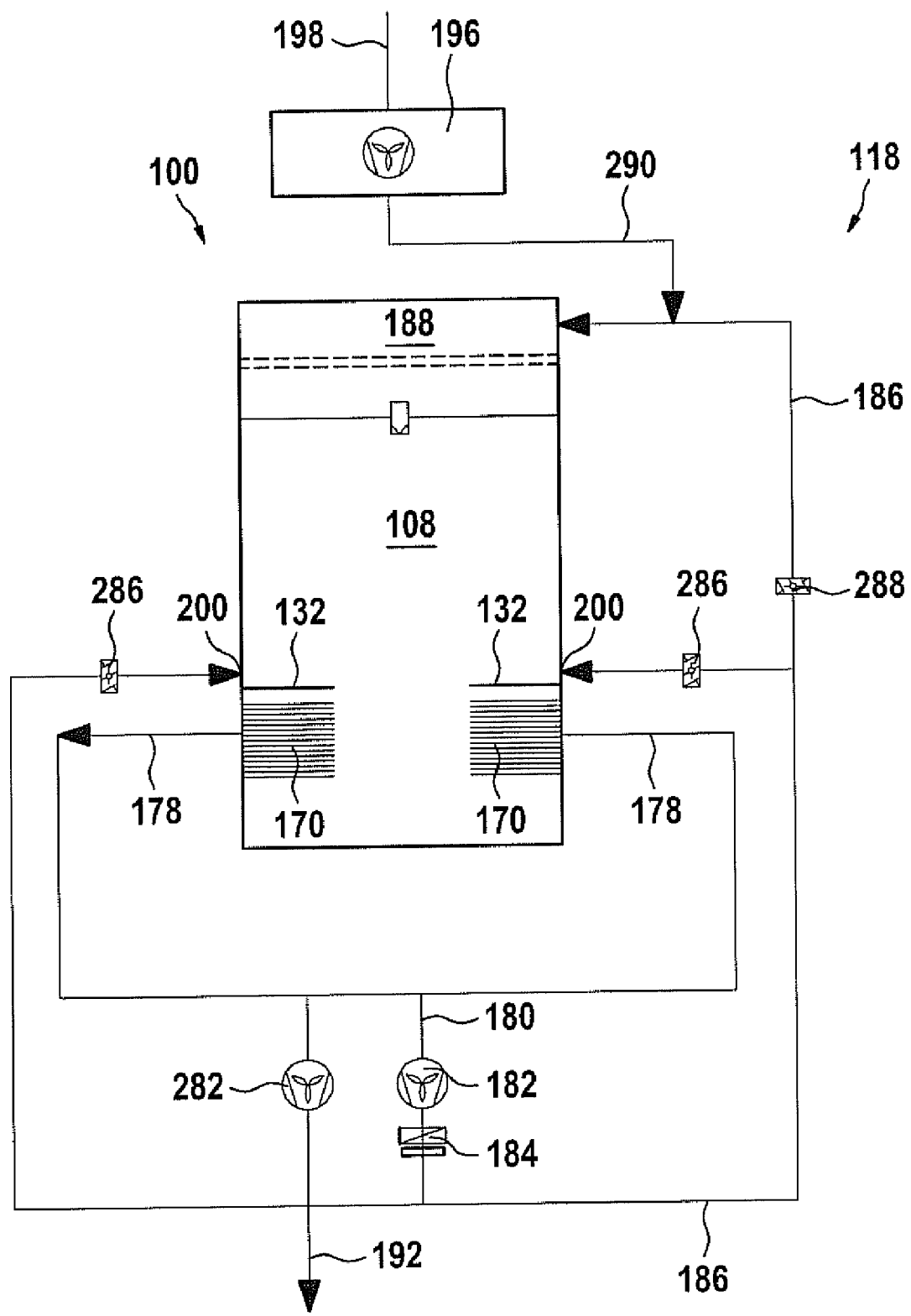
FIG. 13 is a schematic representation of an alternative recirculating air circuit, in which exhaust air is discharged from the recirculating air circuit by means of an exhaust air fan.
Figure 14:
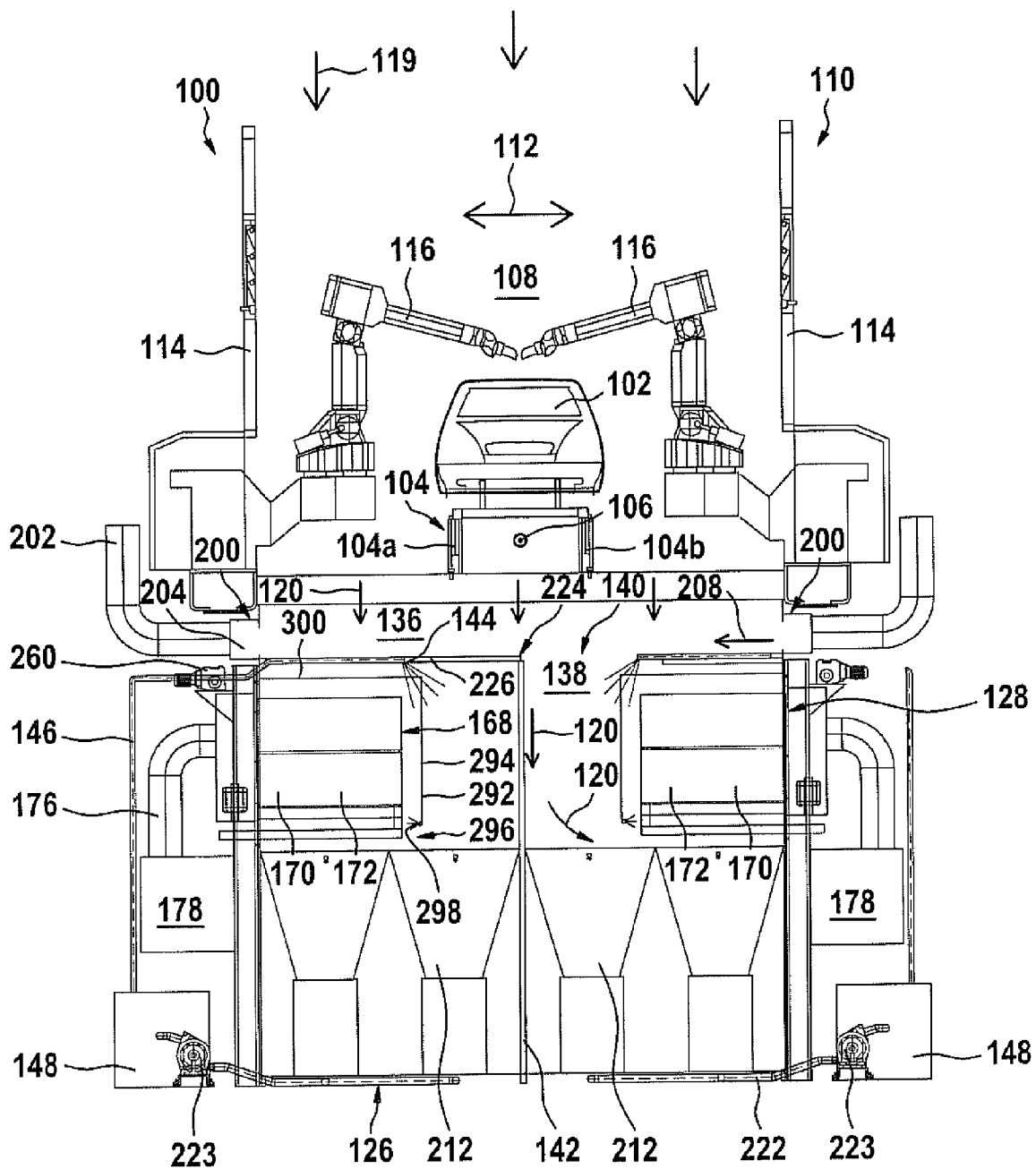
FIG. 14 is a schematic view in vertical section through a second embodiment of a painting cabin with a device arranged below it for separating wet paint overspray from an exhaust air flow containing overspray particles, which comprises two separation devices for separating the overspray from the exhaust air flow, two closing means for intermittently closing off the flow path of the exhaust air flow, two air curtain producing devices for generating a transverse air curtain formation along two flow guide surfaces and a respective covering for the separation devices for producing a constricted region in the flow path of the exhaust air flow between a respective closing device and a respective separation device.
Figure 15:
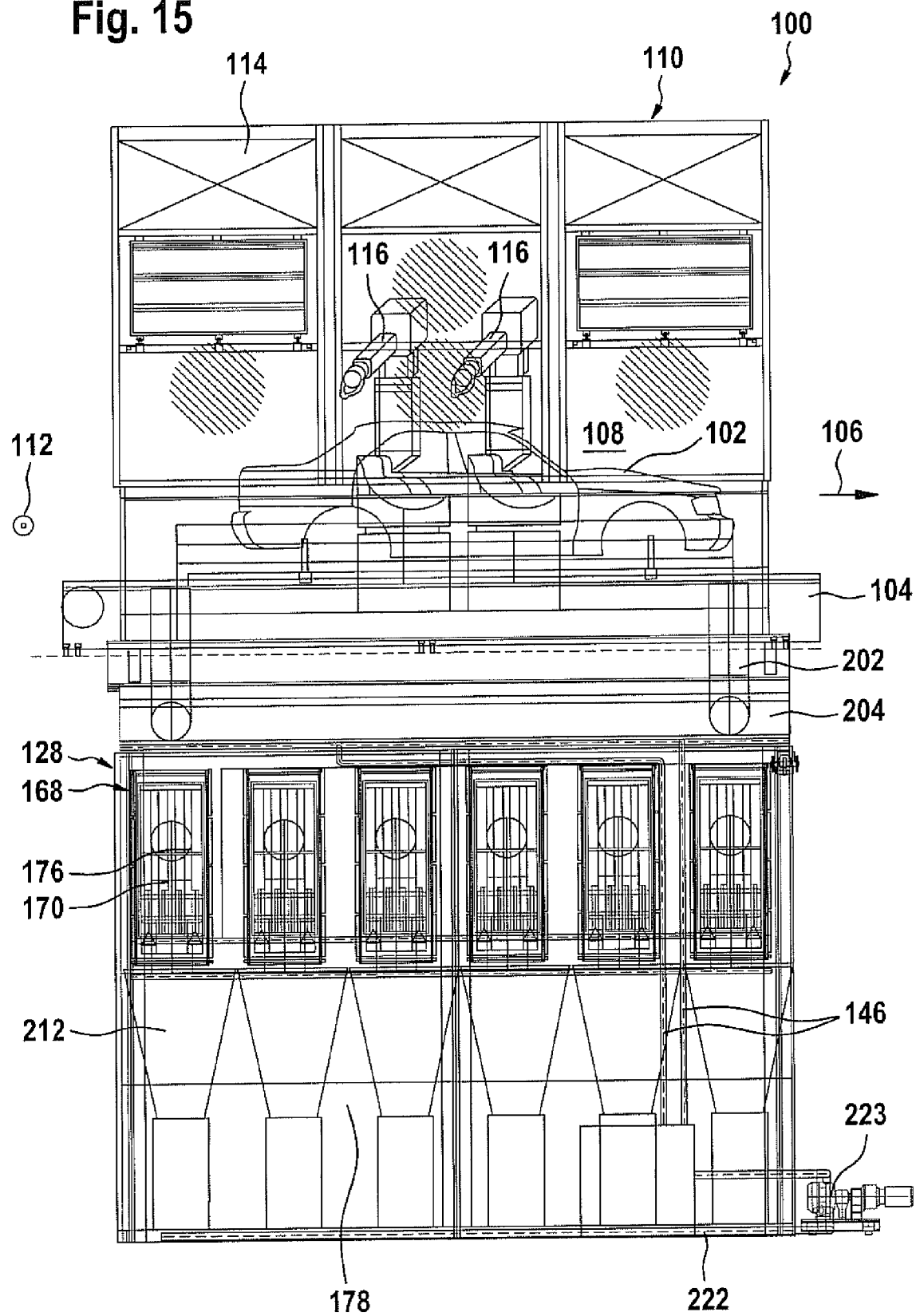
FIG. 15 is a schematic side view of the assembly from FIG. 14.
Figure 16:
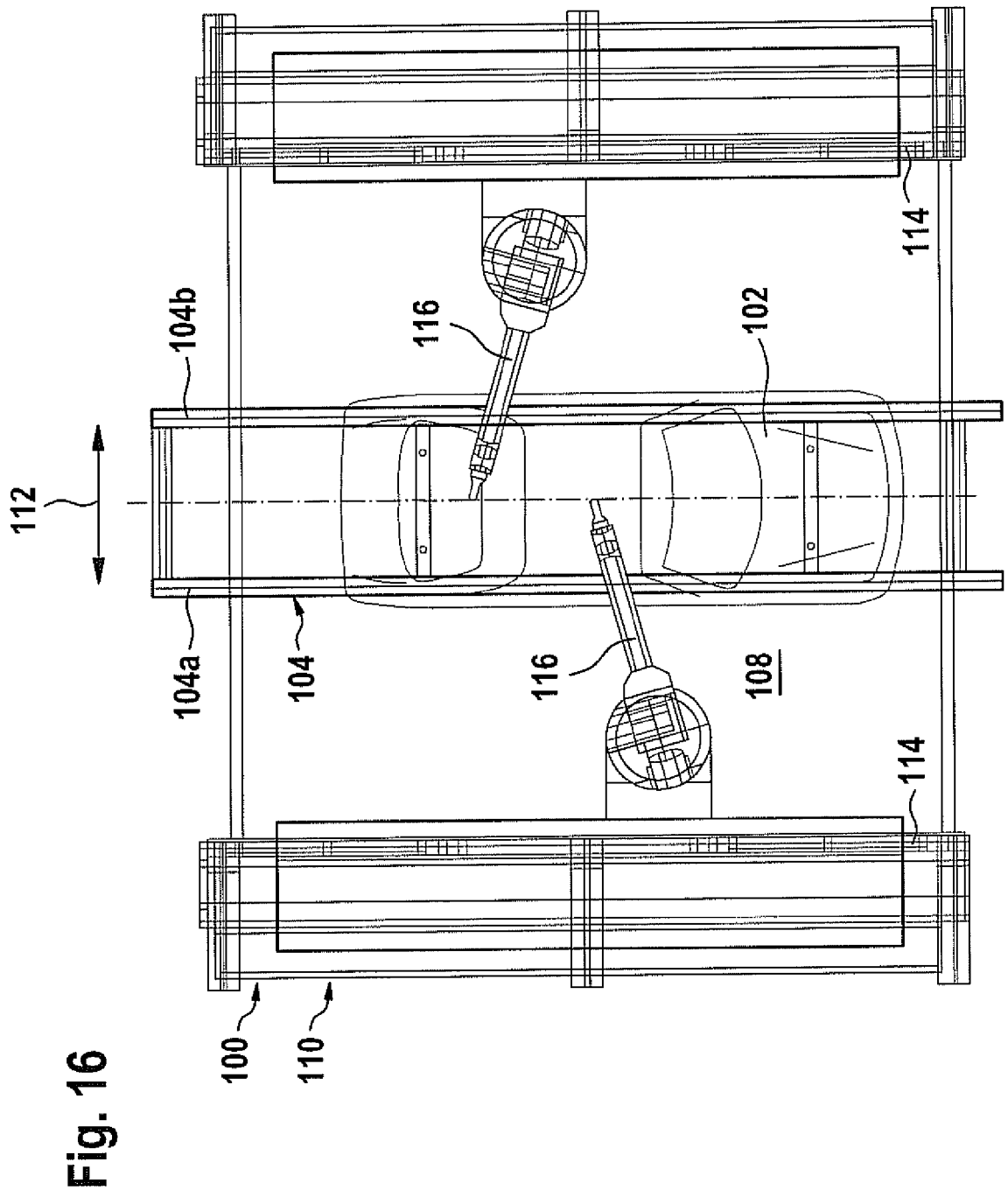
FIG. 16 is a schematic plan view from above onto the assembly from FIGS. 14 and 15.
Figure 17:
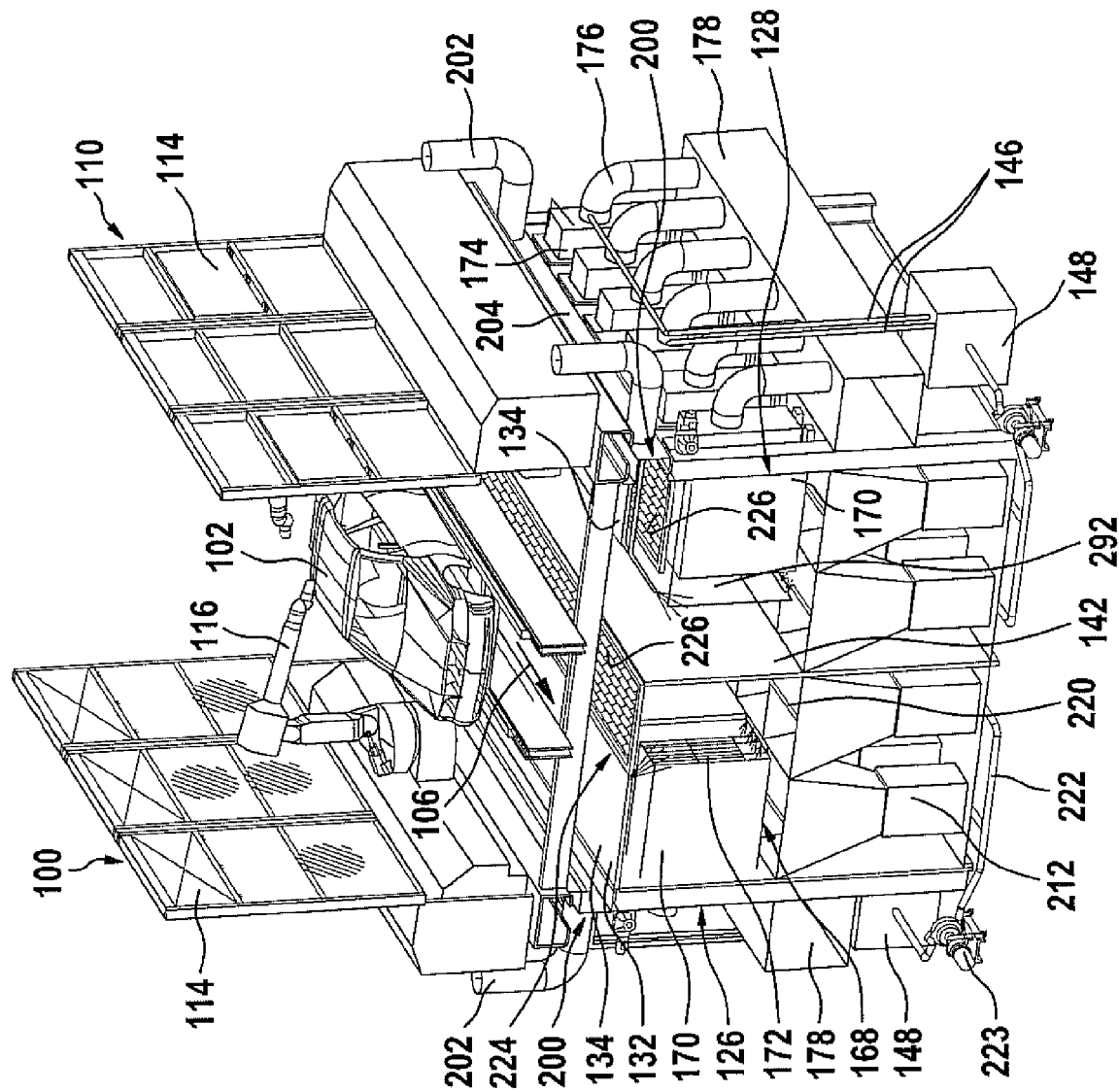
FIG. 17 is a schematic perspective representation of the assembly from FIGS. 14 to 16.

A fourth embodiment, shown in FIG. 13, of an assembly 100 for painting vehicle bodies 102 differs from the above-described third embodiment in that the exhaust air conduit 192, by means of which exhaust air is discharged from the recirculating air circuit 118 into the environment, is provided with an exhaust air fan 282 instead of an exhaust air valve 194.

As a result of this, it is possible to also maintain a vertically downward directed air flow through the application region 108 by means of the inlet air system 196 and the exhaust air fan 282 if the recirculation fan 182 were to fail. As a result of this emergency operation, it is possible to prevent particles, in particular of precoat material and wet paint overspray, from rising out of the flow chamber 128 into the application region 108 even in the event of failure of the recirculation fan 182.

Otherwise, the structure and function of the fourth embodiment shown in FIG. 13 are the same as in the third embodiment shown in FIG. 12, and on this basis reference is made to the above description thereof.

A fifth embodiment, shown in FIGS. 14 to 17, of an assembly 100 for painting vehicle bodies 102 differs from the above-described first embodiment in that after passage through the constriction 140 the exhaust air flow 120 cannot pass directly to the regenerable surface filters 170 of the separation devices 168, but the filter elements 172 of the surface filters 170 are protected from direct entry of the exhaust air flow 120 by a covering 292.

In this embodiment, the exhaust air flow 120 must firstly flow downwards along a vertical side wall 294 of such a covering 292 in order to then be able to pass in substantially horizontal direction through a narrowed region 296 between the lower edge of the covering 292 and the upper edge of the precoat receiving containers 212 to the filter elements 172 of the regenerable surface filters 170.

On the inside of the lower edge of each covering 292 facing the filter elements 172, an additional lower precoat feeding means 298 is respectively arranged, which serves to provide the filter elements 172 with a protective layer of the precoat material.

In this embodiment the precoat feeding means 144 integrated into the flow guide elements 132 merely serve to coat the lateral boundary walls of the lower section 138 of the flow chamber 128 with precoat material in order to protect these surfaces against the adhesion of wet paint overspray from the exhaust air flow 120.

A horizontal cover wall 300 of each covering 292 is respectively arranged below the associated flow guide element 132 and the closing element 226 located in the open position and also above the respectively associated filter element 172 in order to prevent a direct entry of the exhaust air flow 120 from above to the filter elements 172.

The narrowed region 296 between the covering 292, on one side, and the openings 214 of the precoat receiving containers 212, on the other, has a vertical extent in the range of approximately 150 mm to approximately 200 mm.

The mean flow rate of the exhaust air flow 120 through the narrowed region 296 lies in the range of up to approximately 10 m/s.

As a result of this high flow rate, practically no precoat material can pass upwards out of the interior of the covering 292 against the main flow direction of the exhaust air flow 120. Therefore, in the interior enclosed by the covering 292 a cleaning operation and new precoating operation of surface filters 170 can be performed at short time intervals (every 5 minutes, for instance) by means of the lower precoat feeding means 298 without the constriction 140 having to be closed for this purpose by means of the closing means 224.

If a surface filter module comprises ten filter elements, for example, and one of the filter elements is cleaned every 5 minutes, then each filter element is cleaned once approximately every 50 minutes.

Moreover, in this fifth embodiment the filter elements 172 are particularly well protected against clogging with wet paint overspray by the coverings 292.

In this embodiment, the sections 140a, 140b of the constriction 140 are only closed (synchronously or at staggered times) to conduct precoating operations of the lateral boundary walls of the lower section 138 of the flow chamber 128 in the lower section 139 of the flow chamber 128 by means of the upper precoat feeding means 144 and/or by swirling precoat material from the precoat receiving containers 212 by means of the compressed air lances 220 without precoat material being able to pass out of the lower section 138 of the flow chamber 129 into the application region 108 or wet paint overspray being able to pass out of the application region 108 into the lower section 138 of the flow chamber 128 during these operations.

Otherwise, the structure and function of the fifth embodiment shown in FIGS. 14 to 17 are the same as in the first embodiment shown in FIGS. 1 to 10, and on this basis reference is made to the above description thereof.

The invention claimed is:

1. Device for separating wet paint overspray from an exhaust air flow containing overspray particles,
   wherein the overspray particles pass into the exhaust air flow in an application region of a painting assembly,
   wherein the device comprises at least one separation device for separating the overspray from at least a part of the exhaust air flow,
   wherein the device comprises a flow chamber arranged below the application region, which is divided into a plurality of sections by at least one flow guide element, wherein at least one separation device is provided in one of the sections, and
   wherein the device comprises at least one air curtain producing device for generating an air curtain on a wall surface, which delimits the flow path of the exhaust air flow and is arranged on the at least one flow guide element.

2. Device according to claim 1, wherein an amount of air corresponding to approximately 10% to approximately 30% of the amount of exhaust air originating from the application region is fed to the exhaust air flow by means of one or more air curtain producing devices.

3. Device according to claim 1, wherein the air fed by means of the air curtain producing device is cooled.

4. Device according to claim 1, wherein fresh air is fed by means of the air curtain producing device.

5. Device according to claim 1, wherein cleaned exhaust air is fed by means of the air curtain producing device.

6. Device according to claim 1, wherein the wall surface protected by the air curtain is oriented substantially horizontally.

7. Device according to claim 1, wherein the wall surface protected by the air curtain is a flow guide surface, which laterally delimits a constriction in the flow path of the exhaust air flow from the application region to the separation device.

8. according to claim 7, wherein the central flow direction of the air curtain is directed towards the constriction.

9. Device according to claim 7, wherein the constriction is at least partially closable by means of a closing device.

10. Device according to claim 1, wherein the device comprises at least one closing device, by means of which the flow path of the exhaust air flow from the application region to the separation device can be intermittently at least partially closed.

11. Device according to claim 10, wherein the closing device comprises at least one closing element and a moving device, by means of which the closing element is movable into the flow path of the exhaust air flow into a closing position and out of the flow path of the exhaust air flow into an open position.

12. Device according to claim 11, wherein the closing element is configured to be substantially airtight.

13. Device according to claim 12, wherein the closing element comprises a sheet metal plate.

14. Device according to claim 12, wherein the closing element can be brought into a closing position, in which it is covers approximately 80% at most of the cross-section flowed through by the exhaust air flow when the closing element is located in the open position.

15. Device according to claim 11, wherein the closing element comprises an air-permeable filter element.

16. Device according to claim 15, wherein the closing element comprises a support structure, on which the filter element is held.

17. Device according to claim 16, wherein the filter element is held on the support structure by means of a clamping device.

18. Device according to claim 16, wherein the support structure has air passages arranged in a honeycomb configuration.

19. Device according to claim 16, wherein the support structure is formed from a metal material.

20. Device according to claim 11, wherein the moving device comprises at least one guide rail for guiding the closing element.

21. Device according to claim 11, wherein the moving device comprises an electric, hydraulic or pneumatic drive for the closing element.

22. Device according to claim 11, wherein the moving device comprises a circulating transport element, in particular a chain or a toothed belt.

23. Device according to claim 11, wherein the closing element when in the closing position is accessible by an operator.

24. Device according to claim 23, wherein objects to be painted are transported by means of a transport deice through the application region and wherein a vertical spacing between the upper side of the closing element when in the closing position and the underside of the objects to be painted amounts to approximately 2 m at most.

25. Device according to claim 11, wherein the device comprises a support element, against which the closing element is supported in the closing position.

26. Device according to claim 11, wherein in the open position the closing element is arranged below a flow guide element of the device.

27. Device according to claim 10, wherein the device comprises at least one precoat feeding means, which discharges a precoat material into the exhaust air flow downstream of the closing device.

28. Device according to claim 27, wherein the discharge of the precoat material into the exhaust air flow occurs when the closing device at least partially closes off the flow path of the exhaust air flow.

29. Device according to claim 10, wherein the flow path of the exhaust air flow from the closing device to the separation device has at least one constricted region.

30. Device according to claim 29, wherein the central flow direction of the exhaust air flow is oriented substantially horizontally during passage through the constricted region.

31. Device according to claim 29, wherein the device comprises at least one precoat feeding means, which discharges a precoat material into the exhaust air flow downstream of the constricted region.

32. Device according to claim 10, wherein the device comprises at least one receiving container for used precoat material.

33. Device according to claim 32, wherein the receiving container is arranged below the separation device and/or below the closing device.

34. Device according to claim 32, wherein the receiving container is connected to a precoat storage container by means of a precoat discharge conduit.

35. Device according to claim 32, wherein the device comprises at least one compressed air nozzle, by means of which precoat material located in the receiving container can be transported out of the receiving container into the flow path of the exhaust air flow.

36. Device according to claim 1, wherein the separation device comprises at least one regenerable surface filter.

37. Device according to claim 1, wherein at least one precoat storage container is connected to at least one precoat feeding device, which discharges a precoat material into the exhaust air flow.

38. Device according to claim 1, wherein the device has a recirculating air circuit, in which the exhaust air flow, from which the wet paint overspray h(Original) as been separated, is fed at least partially once again to the application region.

39. Assembly for painting objects, in particular vehicle bodies, comprising at least one painting cabin and at least one device for separating wet paint overspray from an exhaust air flow containing overspray particles according to claim 1.

40. Process for separating wet paint overspray from an exhaust air flow containing overspray particles, wherein the overspray particles pass into the exhaust air flow in an application region of a painting assembly, comprising the following process steps:

separating the overspray from at least a part of the exhaust air flow by means of a separation device arranged in a section of a flow chamber, which is arranged below the application region and which is divided into a plurality of sections by at least one flow guide element, and generating an air curtain on a wall surface, which delimits the flow path of the exhaust air flow and is arranged on the at least one flow guide element.

* * * * *

UNITED STATES PATENT AND TRADEMARK OFFICE
CERTIFICATE OF CORRECTION

| | | |
|---|---|---|
| PATENT NO. | : 7,988,769 B2 | |
| APPLICATION NO. | : 12/098210 | |
| DATED | : August 2, 2011 | |
| INVENTOR(S) | : Dietmar Wieland and Jens Holzheimer | |

It is certified that error appears in the above-identified patent and that said Letters Patent is hereby corrected as shown below:

Column 18, Line 37, delete "8. according" and add -- 8. Device according --.
Column 18, Line 57, delete "which it is covers" and add -- which it covers --.
Column 19, Line 22, delete "transport deice" and add -- transport device --.
Column 20, Line 27, delete "overspray h(Original) as been" and add -- overspray has been --.

Signed and Sealed this
Twenty-second Day of November, 2011

David J. Kappos
*Director of the United States Patent and Trademark Office*